(12) United States Patent
Matsukawa et al.

(10) Patent No.: US 8,204,226 B2
(45) Date of Patent: Jun. 19, 2012

(54) ENCODING AND RECORDING APPARATUS, PLAYBACK APPARATUS, AND PROGRAM

(75) Inventors: Shinichi Matsukawa, Fuchu (JP);
Akihiro Kasahara, Sambu-gun (JP);
Hiroshi Suu, Chigasaki (JP); Taku Kato, Kamakura (JP)

(73) Assignees: Kabushiki Kaisha Toshiba, Tokyo (JP);
Toshiba Solutions Corporation, Tokyo (JP)

( * ) Notice: Subject to any disclaimer, the term of this patent is extended or adjusted under 35 U.S.C. 154(b) by 1461 days.

(21) Appl. No.: 11/107,872

(22) Filed: Apr. 18, 2005

(65) Prior Publication Data

US 2005/0213767 A1     Sep. 29, 2005

Related U.S. Application Data

(63) Continuation of application No. PCT/JP03/11477, filed on Sep. 9, 2003.

(30) Foreign Application Priority Data

Oct. 18, 2002 (JP) .................................. 2002-305141
May 9, 2003 (JP) .................................. 2003-131612

(51) Int. Cl.
*H04L 9/00* (2006.01)
(52) U.S. Cl. .......................................... 380/277; 380/281
(58) Field of Classification Search .......... 380/277–282; 713/171
See application file for complete search history.

(56) References Cited

U.S. PATENT DOCUMENTS 6,473,861 B1 * 10/2002 Stokes ........................... 713/193

2001/0011267 A1    8/2001  Kihara et al.
2003/0097340 A1*   5/2003  Okamoto et al. ............... 705/65
2005/0192686 A1*   9/2005  Hirota et al. .................... 700/94

FOREIGN PATENT DOCUMENTS

| JP | 7-323684 | 12/1995 |
| JP | 9-134311 | 5/1997 |
| JP | 9-134330 | 5/1997 |
| JP | 10-133955 | 5/1998 |
| JP | 10-293726 | 11/1998 |
| JP | 11-224456 | 8/1999 |

(Continued)

OTHER PUBLICATIONS

"Content Protection for Recordable Media Specification SD Memory Card Book Common Part", Revision 0.96, Nov. 26, 2001, pp. I-X and from 1 to 26.

(Continued)

*Primary Examiner* — Kim Vu
*Assistant Examiner* — Suman Debnath
(74) *Attorney, Agent, or Firm* — Oblon, Spivak, McClelland, Maier & Neustadt, L.L.P.

(57) ABSTRACT

The present invention relates to an encoding and recording apparatus, a playback apparatus, and a program which solve the possibility of a capacity shortage of a protected area accompanying an increase in an information amount and the number of content keys. It is configured such that an encoded user identifier is recorded in a protected area of a key storage medium. The encoded user identifier is fixed information, and has the characteristic in which a data amount is not increased in connection with a utilization form. Therefore, a capacity shortage of the protected area is not brought about.

17 Claims, 25 Drawing Sheets

FOREIGN PATENT DOCUMENTS

| | | |
|---|---|---|
| JP | 2000-172566 | 6/2000 |
| JP | 2000-305850 | 11/2000 |
| JP | 2001-77802 | 3/2001 |
| JP | 2001-202278 | 7/2001 |
| JP | 2001-249695 | 9/2001 |
| JP | 2002-268766 | 9/2002 |
| WO | WO 01/61600 A1 | 8/2001 |

OTHER PUBLICATIONS

Mamoru Maekawa et al., "Bunsan Operating System", Kyoritsu Shuppan Co., Ltd., Dec. 25, 1991, pp. 175-182.

Office Action issued Jul. 22, 2011, in European Patent Application No. 03808881.1.

* cited by examiner

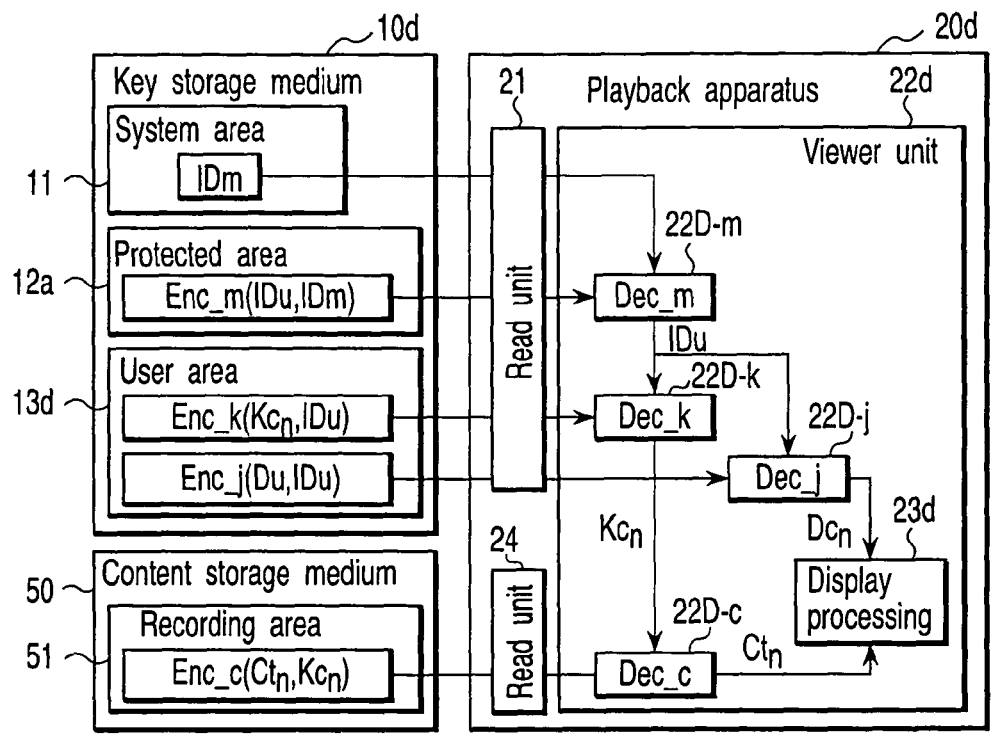
F I G. 7
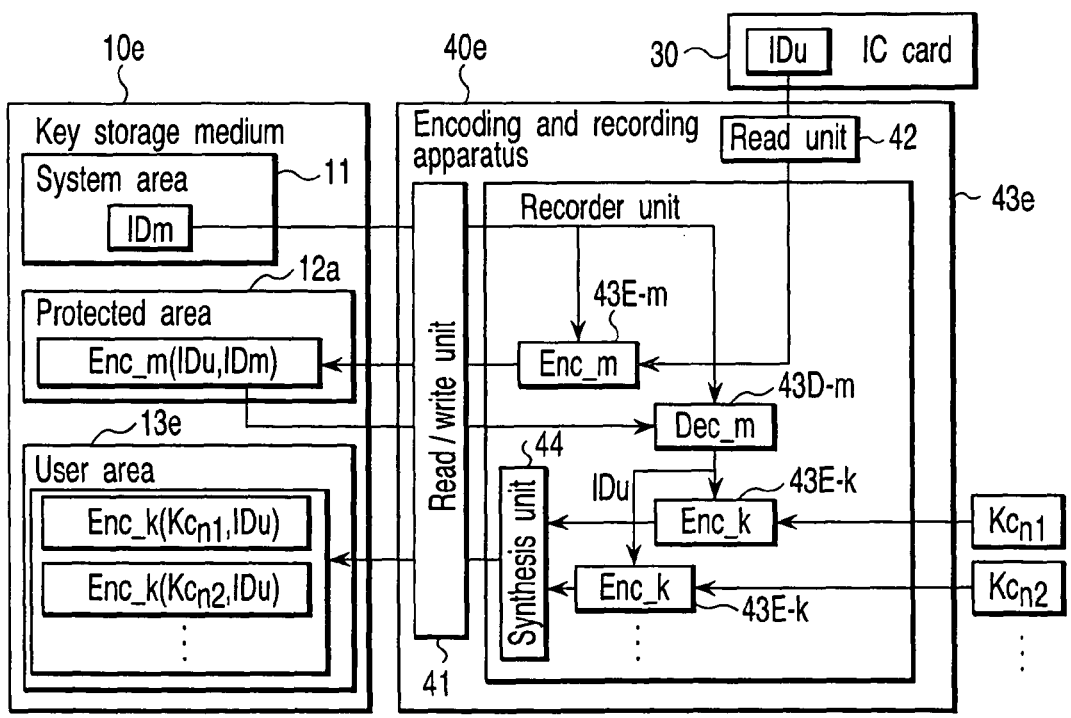
F I G. 8

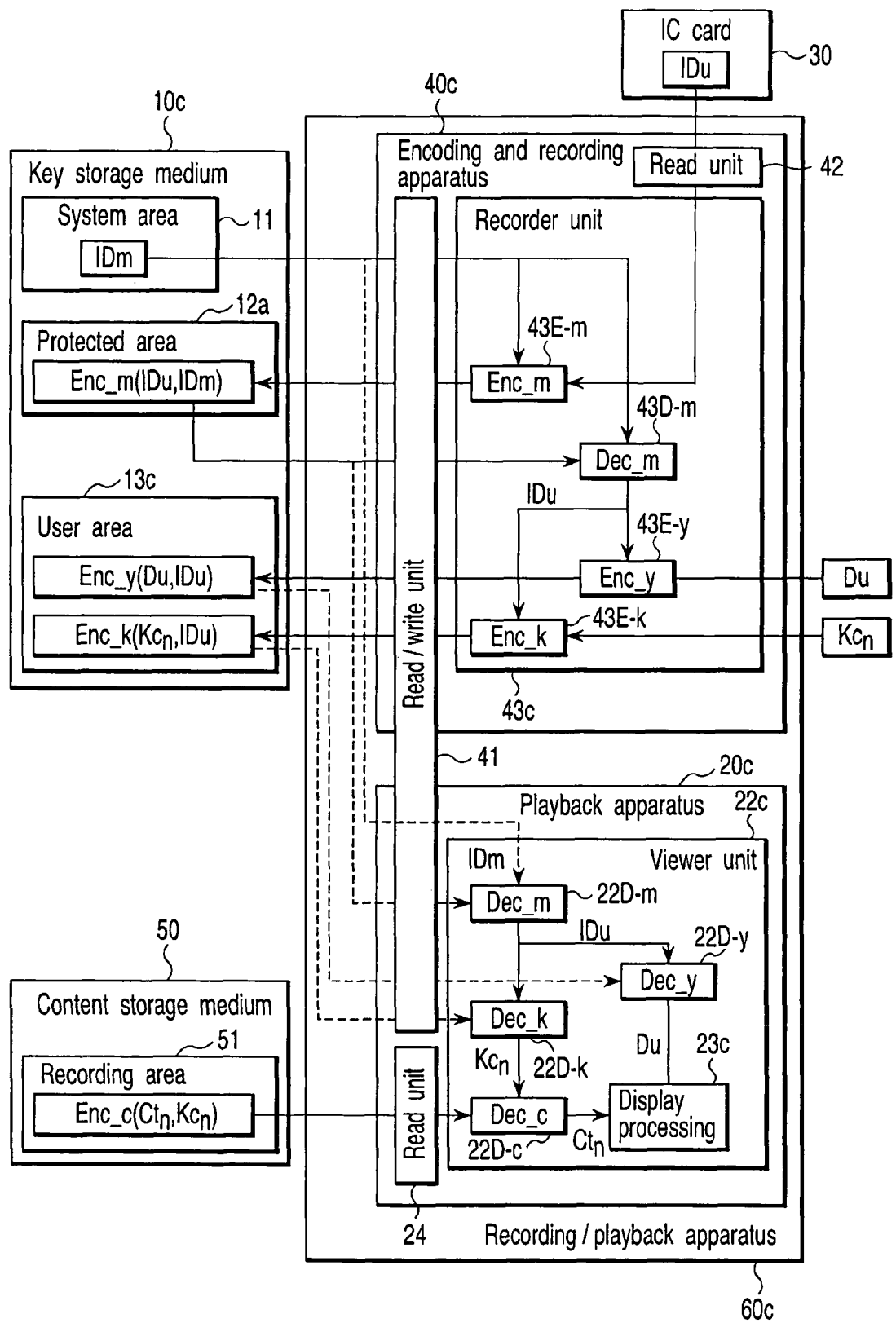
F I G. 13

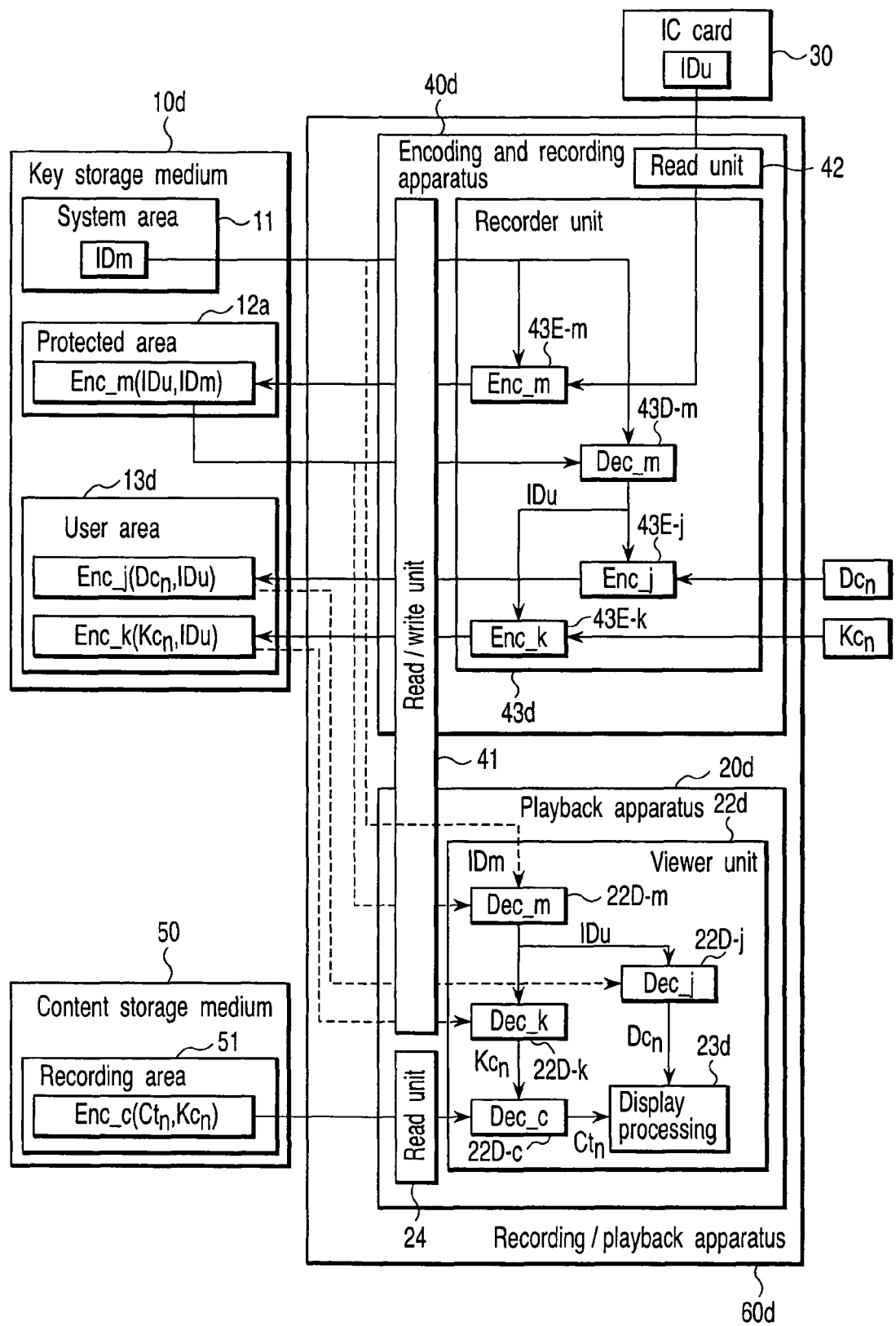
F I G. 14

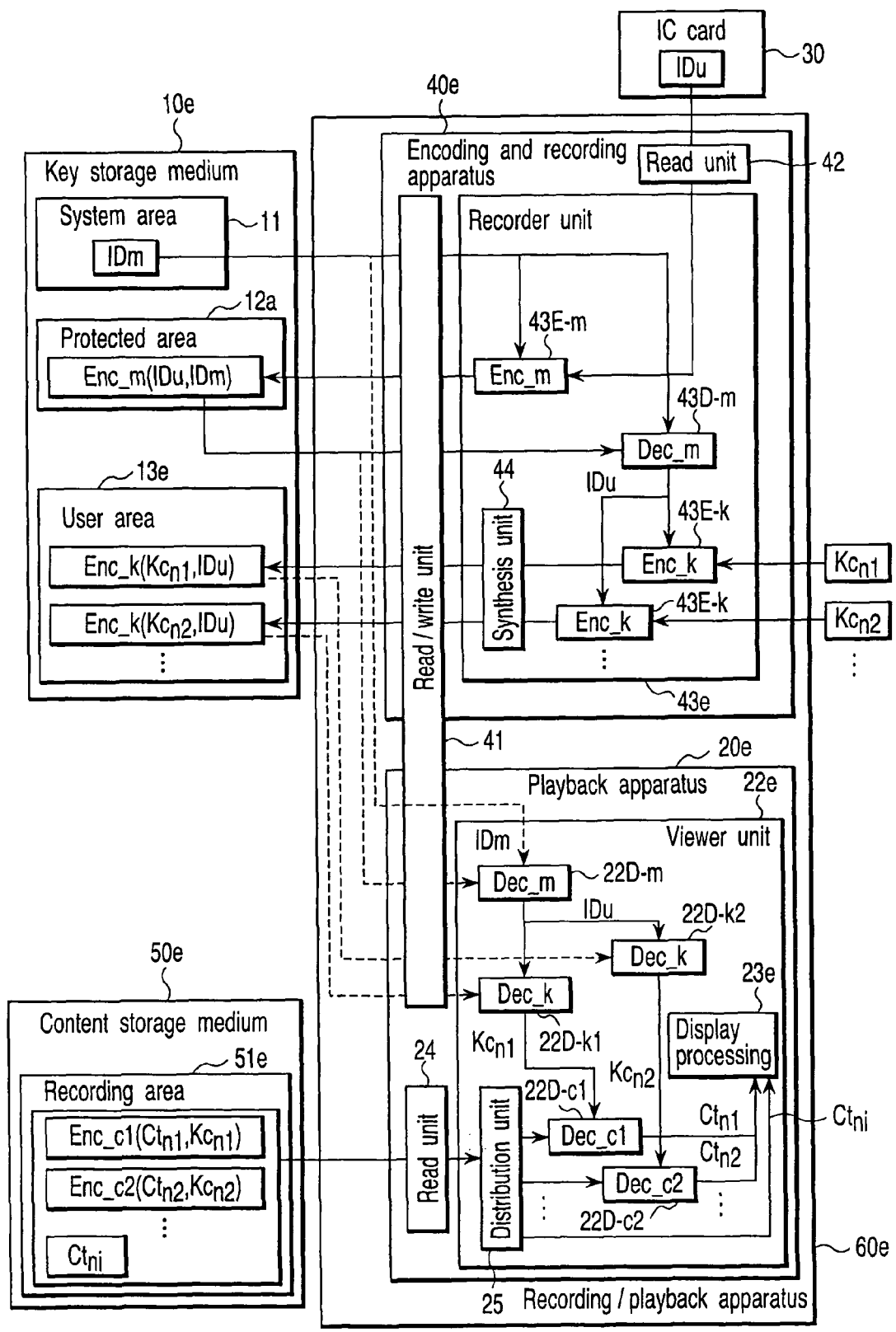
F I G. 16

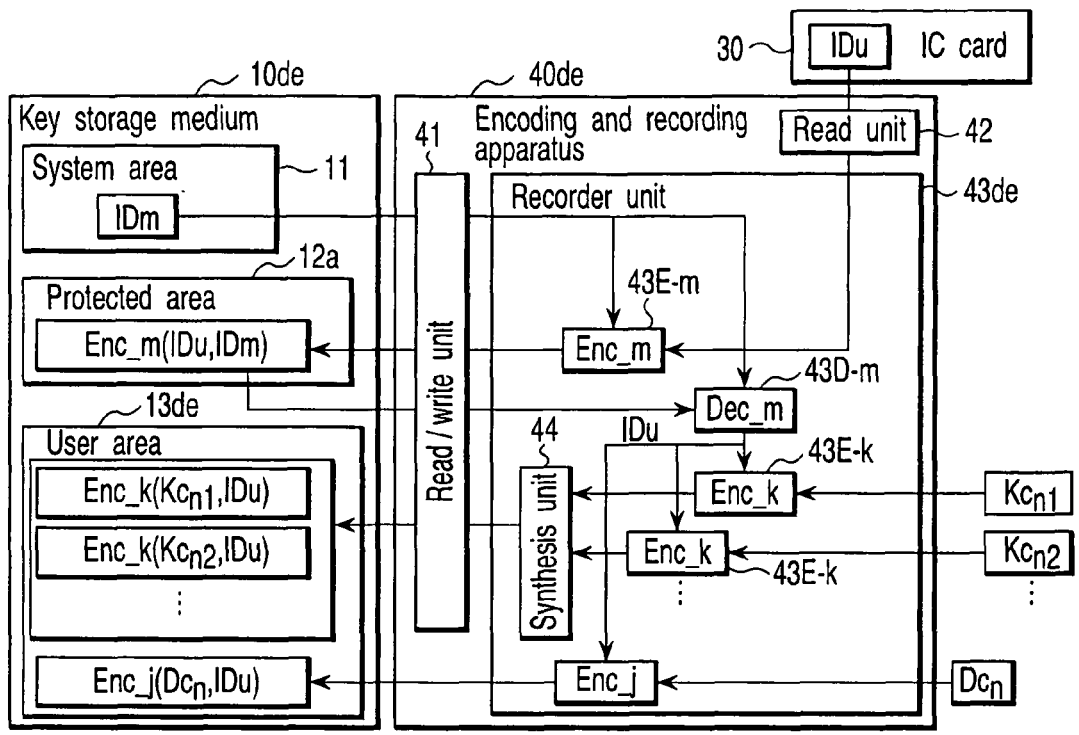
F I G. 21
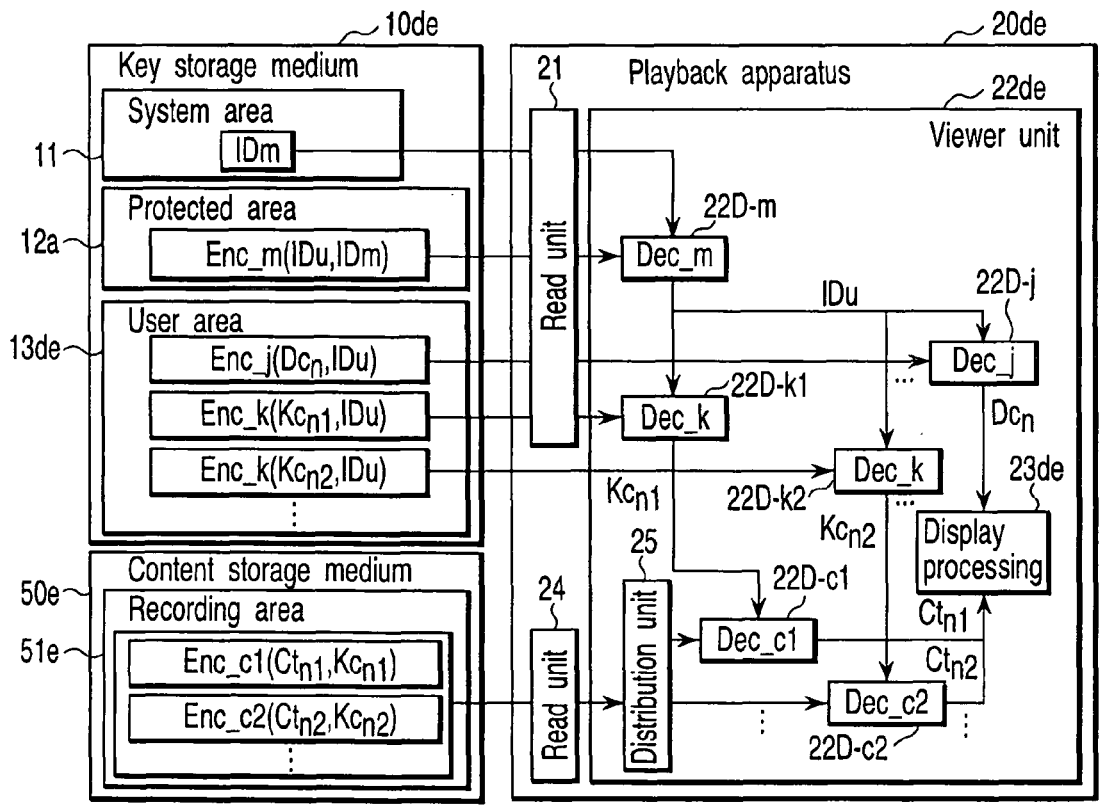
F I G. 22

ENCODING AND RECORDING APPARATUS, PLAYBACK APPARATUS, AND PROGRAM

CROSS-REFERENCE TO RELATED APPLICATIONS

This is a Continuation Application of PCT Application No. PCT/JP03/11477, filed Sep. 9, 2003, which was published under PCT Article 21(2) in Japanese.

This application is based upon and claims the benefit of priority from prior Japanese Patent Applications No. 2002-305141, filed Oct. 18, 2002; and No. 2003-131612, filed May 9, 2003, the entire contents of both of which are incorporated herein by reference.

BACKGROUND OF THE INVENTION

1. Field of the Invention

The present invention relates to an encoding and recording apparatus, a playback apparatus and a program which can solve the possibility of a capacity shortage of a storage medium at the time of utilizing arbitrary content such as e-Book, music, and moving picture.

2. Description of the Related Art

In recent years, accompanying the development of an information-oriented society, a content distribution system by which content in which books, newspapers, music, moving pictures or the like are digitized (hereinafter, simply called content) are distributed to user terminals, and the content can be browsed has been broadly used.

However, because digitized content can be easily duplicated, an illegal act that the copyright of content is ignored is easily brought about. From the standpoint of preventing such an illegal act, a recording/playback system in which digitized content are encoded to record, and are decoded at the time of playback is usually used.

FIG. 43 is a schematic diagram showing a configuration of a secure storage medium and a playback apparatus for explanation of such a recording/playback system. A secure storage medium 10 has a system area 11, a protected area 12, and a user area 13.

The system area 11 is an area of which only a regular playback apparatus 20 can read out a medium identifier $ID_m$, and has stored therein a medium identifier $ID_m$ which is identification information peculiar to a medium.

The protected area 12 is an area of which a general user cannot read out data directly, and has stored therein an encoded content key $Enc\_k(Kc_n, ID_m)$ formed due to a content key $Kc_n$ being encoded by a medium identifier $ID_m$ is stored.

The user area 13 is an area of which a general user can read out data directly, and has stored therein encoded content data $Enc\_c(Ct_n, Kc_n)$ formed due to content data $Ct_n$ being encoded by a content key $Kc_n$.

With respect to the secure storage medium 10 as described above, the playback apparatus 20 operates as follows. Namely, at the playback apparatus 20, after an equipment authentication with the secure storage medium 10, a viewer unit 22 reads out a medium $ID_m$ of the system area 11 of the secure storage medium 10 via a read unit 21, and reads out an encoded content key $Enc\_k(Kcm, ID_m)$ of the protected area 12 of the secure storage medium 10.

Next, at the viewer unit 22, a decoding unit Dec_k decodes the encoded content key $Enc\_k(Kc_n, ID_m)$ on the basis of the medium identifier $ID_m$, and obtains a content key $Kc_n$.

Thereafter, at the viewer unit 22, the encoded content data $Enc\_c(Ct_n, Kc_n)$ read out of the user area 13 of the secure storage medium 10 via the read unit 21 is encoded on the basis of this content key $Kc_n$, and the obtained content data $Ct_n$ is displayed by a display processing unit 23.

Note that, related prior arts other than FIG. 43 are disclosed in "Content Protection for Recordable Media Specification SD Memory Card Book, Common Part", <URL: http://www.4Centity.com>.

In a recording/playback system as described above, however, there is no problem usually. However, in accordance with the examination of the inventors, as will be described hereinafter, it can be thought that there is room for improvement because there is a possibility that the storage capacity of the protected area 12 is insufficient Namely, the storage capacity of the protected area 12 of the secure storage medium 10 is, for example, in a case of an SD card, about 10 percents of the total capacity at the maximum.

On the other hand, an information amount of the content key $Kc_n$ has been increasing accompanying that a key length and attendant information are on the upward trend. In addition thereto, the number of content keys $Kc_n$ will increase in proportion to the number of content data $Ct_n$ to be recorded.

Accordingly, the possibility that the storage capacity of the protected area 12 of the secure storage medium 12 is coming to be insufficient due to an increase in the information amount of the content keys $Kc_n$ themselves and an increase in the number of the content keys $Kc_n$ can be thought of.

An object of the present invention is to provide an encoding and recording apparatus, a playback apparatus, and a program which can solve the possibility of a capacity shortage of a protected area accompanying an increase in an information amount and the number of content keys.

BRIEF SUMMARY OF THE INVENTION

According to a first aspect of the present invention, there is provided an encoding and recording apparatus for, when content key information corresponding to encoded content recorded in a content storage medium is input, encoding the content key information and recording it in a storage medium, the encoding and recording apparatus comprising: first encoding means for encoding fixed information which are input in advance and different for each user, and for writing the obtained encoded fixed information in a protected area of the storage medium; decoding means for obtaining fixed information by decoding the encoded fixed information in the protected area; and second encoding means for encoding the content key information on the basis of the fixed information obtained by the decoding means or fixed information newly input, and for writing the obtained encoded content key information in a data area of the storage medium other than the protected area.

According to a second aspect of the present invention, there is provided a playback apparatus for decoding encoded content key information recorded in a content storage medium on the basis of encoded fixed information and encoded content key information which have been recorded in a key storage medium, and for outputting decoded results, the playback apparatus comprising: first decoding means for decoding the encoded fixed information in the key storage medium to obtain fixed information; second decoding means for decoding the encoded content key information in the key storage medium on the basis of the fixed information to obtain content key information; third decoding means for decoding the encoded content key information in the content storage medium on the basis of the decoded content key information to obtain content key information; and output processing means for processing to output the decoded content information.

Accordingly, according to the first and second aspects of the invention, because fixed information (the data amount does not increase in connection with a utilizing from) is recorded at the protected area of the storage medium differently from the prior art, the possibility of a capacity shortage of the protected area accompanying an increase in the information amount and the number of content keys can be solved.

Note that, the above-described first and second aspects express "apparatus" for each apparatus, but not limited thereto. It goes without saying that each of the respective apparatuses or an aggregate of the respective apparatuses may be expressed "an apparatus", "a system", "a method", "a storage medium which can be read out by a computer", or "a program".

BRIEF DESCRIPTION OF THE SEVERAL VIEWS OF THE DRAWING

FIG. 7 is a schematic diagram showing a configuration of the key storage medium, a content storage medium, and a playback apparatus in the embodiment.

FIG. 8 is a schematic diagram showing a configuration of an encoding and recording apparatus and a key storage medium according to a fifth embodiment of the present invention.

FIG. 13 is a schematic diagram showing a configuration of a recording/playback apparatus according to an eighth embodiment of the present invention.

FIG. 14 is a schematic diagram showing a configuration of a recording/playback apparatus according to a ninth embodiment of the present invention.

FIG. 16 is a schematic diagram for explanation of a modified example in the embodiment.

FIG. 21 is a schematic diagram showing a configuration of an encoding and recording apparatus and a key storage medium according to a thirteenth embodiment of the present invention.

FIG. 22 is a schematic diagram showing a configuration of the key storage medium, a content storage medium, and a playback apparatus in the embodiment.

DETAILED DESCRIPTION OF THE INVENTION

Hereinafter, respective embodiments of the present invention will be described with reference to the drawings. Although the respective embodiments will be described thereinafter, the notation in this specification will be described so as to be summarized in advance thereof.

$Kc_n$: Content key information whose content ID is n.

$Ct_n$: Content data information whose content ID is n.

Note that, the content key information $Kc_n$ and the content data information $Ct_n$ are associated with one another by content IDs embedded in advance into headers or the like.

$ID_u$: User identifier peculiar to user

Du: User attribute information

Note that, the user attribute information Du is associated with the user identifier $ID_u$ in advance. Further, the content of the user attribute information are additional information such as, for example, a name, an age, an address, and a type of membership.

$Dc_n$: Content attribute information whose content ID is n.

Note that, the content of the content attribute information are additional information such as, for example, utilization information and use information of the content.

$Kc_{n1}$: First content key information among the content key information whose content IDs are n.

$Ct_{n1}$: First content data information among the content data information whose content IDs are n.

Enc_x(A, B): Information in which A is encoded with an encoding method x by using the key of B.

Enc_x, Dec_x: Encoding and decoding methods respectively with the x method.

(First Embodiment)

Figure 1:
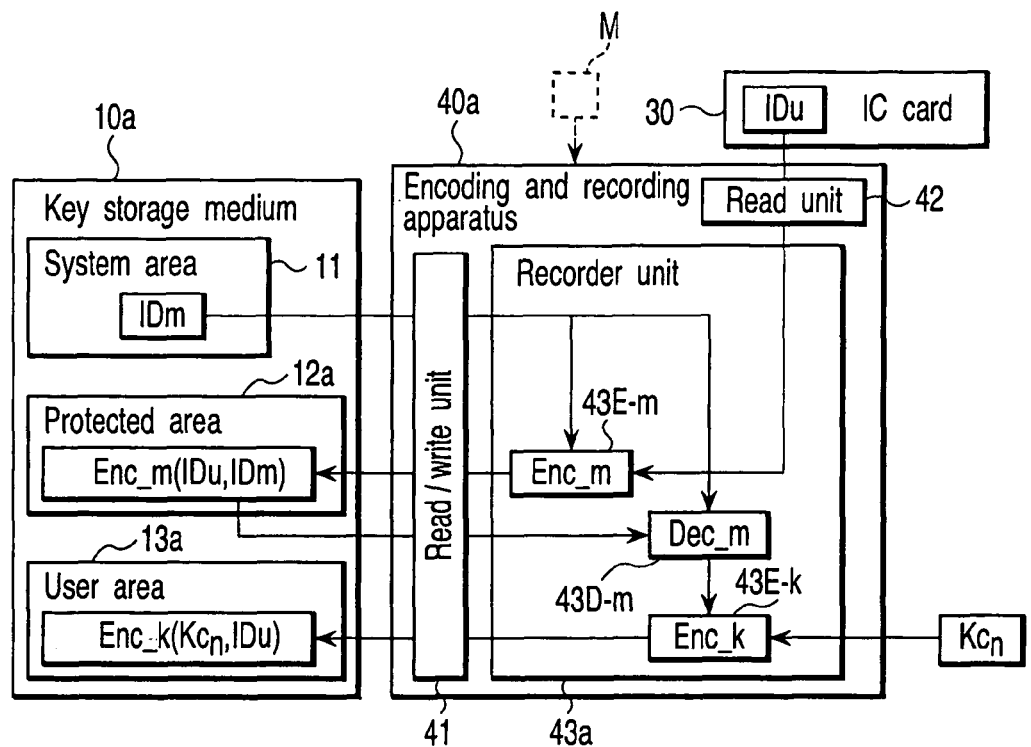
FIG. 1 is a schematic diagram showing a configuration of an encoding and recording apparatus and a key storage medium according to a first embodiment of the present invention.
Figure 2:
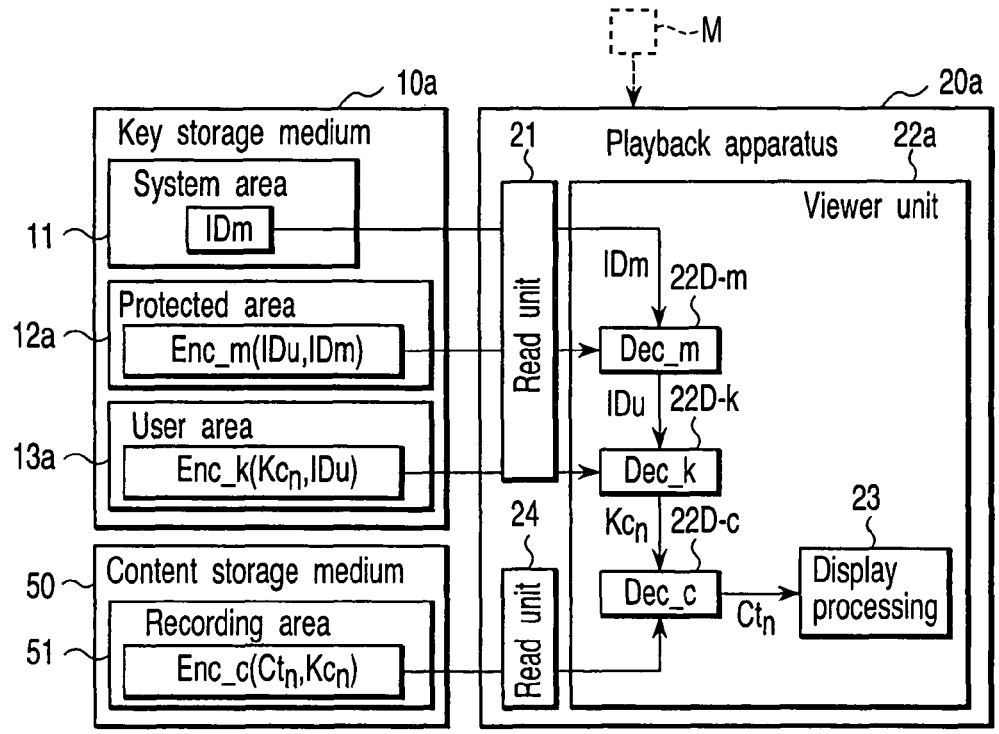
FIG. 2 is a schematic diagram showing a configuration of the key storage medium, a content storage medium, and a playback apparatus in the embodiment.
Figure 43:
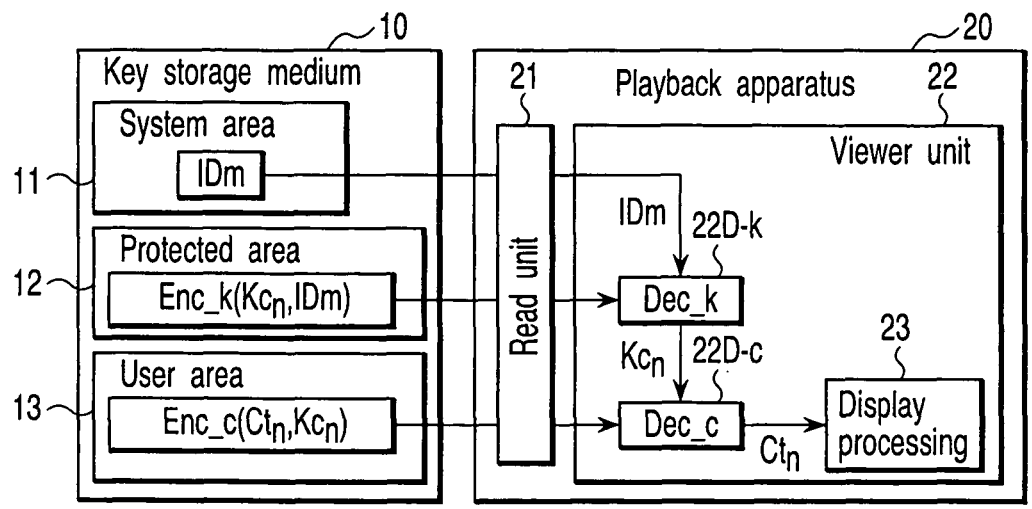
FIG. 43 is a schematic diagram showing a configuration of conventional secure storage medium and playback apparatus.

FIG. 1 is a schematic diagram showing a configuration of an encoding and recording apparatus and a key storage medium according to a first embodiment of the present invention, and FIG. 2 is a schematic diagram showing a configuration of the key storage medium, a content storage medium, and a playback apparatus in the embodiment, and portions which are the same as those in FIG. 43 described above are denoted by the same reference numerals, and detailed descriptions thereof will be omitted, and here, different portions will be mainly described. Note that duplicated descriptions will be omitted in the same way as in the following respective embodiments and modified embodiments thereof as well.

Namely, the present embodiment is to solve the possibility of a storage capacity shortage at a conventional protected area 12, and is configured, specifically, such that a content key $Kc_n$ whose data amount easily increases in connection with the utilization form is not recorded, and fixed information whose data amount does not increase in connection with the utilization form is stored at a protected area 12*a*.

As a representative example of fixed information, the following information (1) is used in the respective embodiments.

(1) Information in which user identifier $ID_u$s peculiar to respective users (different for each user) are encoded.

However, as the fixed information different for each user, it is not limited thereto, and arbitrary fixed information such as one of the following information (2) to (6) or the like can be used.

(2) Information in which a value $h(ID_u)$ obtained by applying a one-way function to user identifier $ID_u$ is encoded.

(3) Information in which user attribute information Du is encoded.

(4) Information in which a value h(Du) obtained by applying a one-way function to user attribute information Du is encoded.

(5) Attribute information of the key storage medium 10*a*.

(6) Information in which a value obtained by applying a one-way function to attribute information of the key storage medium 10*a* is encoded.

Further, when the user attribute information Du is used as fixed information, it is not limited to the case where the content of attributes are different for each user, and some of attribute items may be different for each user.

In any case, it is a mechanism that, in accordance with the configuration in which fixed information is stored in the protected area 12*a* in this way, it is impossible for the capacity of the protected area 12*a* to be insufficient even if the key length and the number of the content keys $Kc_n$ increase.

To describe in detail, as the key storage medium 10*a*, for example, an SD card can be used, and the system area 11 described above, and the protected area 12*a* and a user area 13*a* in which the storage content are different from those in the above description are provided.

The protected area 12*a* is an area of which a general user cannot read out data directly, and has stored therein an encoded user identifier $Enc\_k(ID_u, ID_m)$ formed due to user identifier $ID_u$ being encoded by a medium identifier $ID_m$.

The user area 13a is an area of which a general user can read out data directly, and has stored therein encoded content key Enc_k(Kc$_n$, ID$_m$) formed due to a content key Kc$_n$ being encoded by a medium identifier ID$_m$. Note that the encoded content key Enc_k(Kc$_n$, ID$_m$) may be stored at, not only the user area 13a, but also another area to which a general user can access.

An IC card 30 is a card on which the user identifier ID$_u$ has been stored, and can be read out of an encoding and recording apparatus 40a.

The encoding and recording apparatus 40a has a read/write unit 41, a read unit 42, and a recorder unit 43a.

The read/write unit 41 is an interface device between the key storage medium 10a and the recorder unit 43a, and for example, a card reader writer can be used.

The read unit 42 is an interface device between the IC card 30 and the recorder unit 43a, and for example, a card reader can be used.

The recorder unit 43a is composed of software for encoding and recording which has been installed in advance into a computer of the encoding and recording apparatus 40a, one function of a CPU (not shown) operated by the software, a memory for temporarily storing processed results, and the like, and has an encoding unit 43E-m and a decoding unit 43D-m in a method m, and an encoding unit 43E-k in a method k. Note that the software for encoding and recording of the recorder unit 43a may be realized by installing a program stored in an external storage medium M as shown by the broken line in FIG. 1, and may be realized by a ROM having the program stored therein in advance, or the like. In the following respective embodiments, illustrations of the external storage mediums M will be omitted. However, it goes without saying that the software for encoding and recording can be realized by installing the program in the external storage medium M in the same way as described above. It goes without saying that, as the recorder unit 43a, not only software and one function of a CPU, but also a hardware circuit for decoding may be used as desired.

Further, the encoding methods m, k may be transformed to methods which are the same as one another. This is in the same way as other encoding methods c, y, j which will be described later. Namely, all the encoding methods m, k, c, y, j in this specification are different from one another. However, those are not limited thereto, and may be transformed to methods which are the same as one another. Alternatively, only a set of arbitrary encoding methods may be transformed to methods which are the same as one another.

Here, the encoding unit 43 E-m has a function of encoding the user identifier ID$_u$ read out of the IC card 30 by the read unit 42 on the basis of the medium identifier ID$_m$ read out of the system area 11 of the key storage medium 10a by the read/write unit 41, and of writing the obtained an encoded user identifier Enc_m(ID$_u$, ID$_m$) in the protected area 12a of the key storage medium 10a via the read/write unit 41.

Note that the user identifier ID$_u$ input to the encoding unit 43E-m is not limited to a form of reading out of the IC card 30, and may be transformed to a form of reading out of an arbitrary place on a network, or a form of reading out of a key storage medium 10b as will be described later. The points which can be changed to these respective forms are common to all the following embodiments. Further, the encoding unit 43E-m is not an element essential to the encoding and recording apparatus 40a, and may be omitted. As a form of omitting it, for example, there is a case where the encoding and recording apparatus writes the encoded content key Enc_k(Kc$_n$, ID$_u$) in the user area 13a of the key storage medium 10a with the key storage medium 10a into which the encoded user identifier Enc_m(ID$_u$, ID$_m$) has been written in advance being used as an object, and the like. This point that the encoding unit 43E-m can be omitted is common to all the following embodiments in the same way as described above.

Here, the decoding unit 43 D-m has a function of decoding the user identifier Enc_m(ID$_u$, ID$_m$) read out of the system area 11 of the key storage medium 10a by the read/write unit 41 on the basis of the medium identifier ID$_m$ read out of the system area 11 of the key storage medium 10a by the read/write unit 41, and of transmitting the obtained user identifier ID$_u$ to the encoding unit 43E-k.

The encoding unit 43E-k has a function of encoding the content key Kc$_n$ input from the exterior on the basis of the user identifier ID$_u$ received from the decoding unit 43D-m, and of writing the obtained encoded content key Enc_k(Kc$_n$, ID$_u$) in the user area 13a of the key storage medium 10a via the read/write unit 41.

A content storage medium 50 is a medium in which encoded content data Enc_k(Ct$_n$, Kc$_n$) formed due to content data being encoded by a content key has been stored in advance, and can be read out of a playback apparatus 20a. Note that the key storage medium 10a and the content storage medium 50 may be any of media physically different from one another and same media, and this is in the same way as in the following respective embodiments.

The playback apparatus 20a is composed of software for playback which has been installed in advance into a computer of the playback apparatus 20a, one function of a CPU (not shown) operated by the software, a memory for temporarily storing processed results, and the like, and has a read unit 21, a viewer unit 22a and the read unit 24. Note that, the software for playback may be realized by installing a program stored in advance in the external storage medium M as shown by the broken line in FIG. 2, and may be realized by a ROM having a program stored therein in advance, or the like. In the following respective embodiments, the external storage medium M will be omitted. However, it goes without saying that the software for playback can be realized by installing the program in the external storage medium M in the same way as described above. However, it goes without saying that, as the viewer unit 22a, not only software and one function of a CPU, but also a hardware circuit for encoding/decoding may be used as desired.

As compared with the viewer unit 22 described above, a decoding unit 22D-m with an encoding method m is added to the viewer unit 22a, and further, an input origin of the encoded content key Enc_k(Kc$_n$, ID$_u$) of the decoding unit 22D-k is changed to the user area 13a of the key storage medium 10a, and an input origin of the encoded content data Enc_c(Ct$_n$, Kc$_n$) of the decoding unit 22D-c is changed to the content storage medium 50 via the read unit 24.

Here, the decoding unit 22D-m has a function of decoding the encoded user identifier Ecn_m(ID$_u$, ID$_m$) read out of the protected area 12a of the key storage medium 10a by the read unit 21 on the basis of the medium identifier ID$_m$ read out of the system area 11 of the key storage medium 10a by the read unit 21, and of transmitting the obtained user identifier ID$_u$ to the decoding unit 22D-k.

The read unit 24 is an interface device between the content storage medium 50 and the viewer unit 22a, and for example, a card reader can be used.

Next, operations of the encoding and recording apparatus and the playback apparatus configured as described above will be described.

(Encoding Recording)

First, because the user identifier ID$_u$ does not exist in the initial state of the key storage medium 10a, it is necessary to carry out processing of writing the user identifier $ID_u$. Here, the user identifier $ID_u$ is written into a medium such as the ID card 30, and is distributed to a user.

The user inserts the IC card 30 into the encoding and recording apparatus 40a.

At the encoding and recording apparatus 40a, the recorder unit 43a encodes the user identifier $ID_u$ read out of the IC card 30 to be temporarily maintained in a memory (not shown), on the basis of the medium identifier $ID_m$ read out of the key storage medium 10a, and writes the maintained an encoded user identifier $Enc\_m(ID_u, ID_m)$ in the protected area 12a of the key storage medium 10a via the read/write unit 41.

Because the user identifier $ID_u$ for preparing an encoded content key is stored in accordance therewith, it is possible for the key storage medium 10a to store an encoded content key.

Hereinafter, the recorder unit 43a of the encoding and recording apparatus 40a decodes the encoded user identifier $Enc\_m(ID_u, ID_m)$ read out of the key storage medium 10a on the basis of the medium identifier $ID_m$ read out of the key storage medium 10a.

Then, the recorder unit 43a encodes the content key $Kc_u$ input from the exterior to be temporarily maintained in the memory, on the basis of the decoded user identifier $ID_u$, and writes the maintained encoded content key $Enc\_k(Kc_n, ID_u)$ in the user area 13a of the key storage medium 10a via the read/write unit 41.

(Playback)

At the playback apparatus 20a, the viewer unit 22a decodes the encoded user identifier $Enc\_m(ID_u, ID_m)$ read out of the key storage medium 10a to be temporarily maintained in a memory (not shown), on the basis of the medium identifier $ID_m$ read out of the key storage medium 10a, and decodes the encoded content key $Enc\_k(Kc_n, ID_u)$ read out of the key storage medium 10a on the basis of the maintained user identifier $ID_u$.

Then, the viewer unit 22a encodes the encoded content data $Enc\_c(Ct_n, Kc_n)$ read out of the content storage medium 50 to be temporarily maintained in the memory on the basis of the decoded content key $Kc_n$, and performs display processing for the maintained content data $Ct_n$ by a display processing unit 23. Note that the display processing unit 23 can execute, not only the display processing, but also display processing and/or audio output processing appropriately in accordance with the content of the content data.

As described above, according to the present embodiment, the possibility of a capacity shortage of a protected area accompanying an increase in an information amount and the number of content keys can be solved by the configuration in which fixed information whose data amount does not increase in connection with a utilization form (for example, an encoded user identifier) is recorded in the protected area 12a differently from the prior art.

Further, because a content key is not recorded in the protected area 12a whose storage capacity is small, and the content key is recorded in the user area 13a or the like whose storage capacity is large, a content key with a long key length or a large number of content keys can be recorded in the secure storage medium.

(Second Embodiment)

Figure 3:
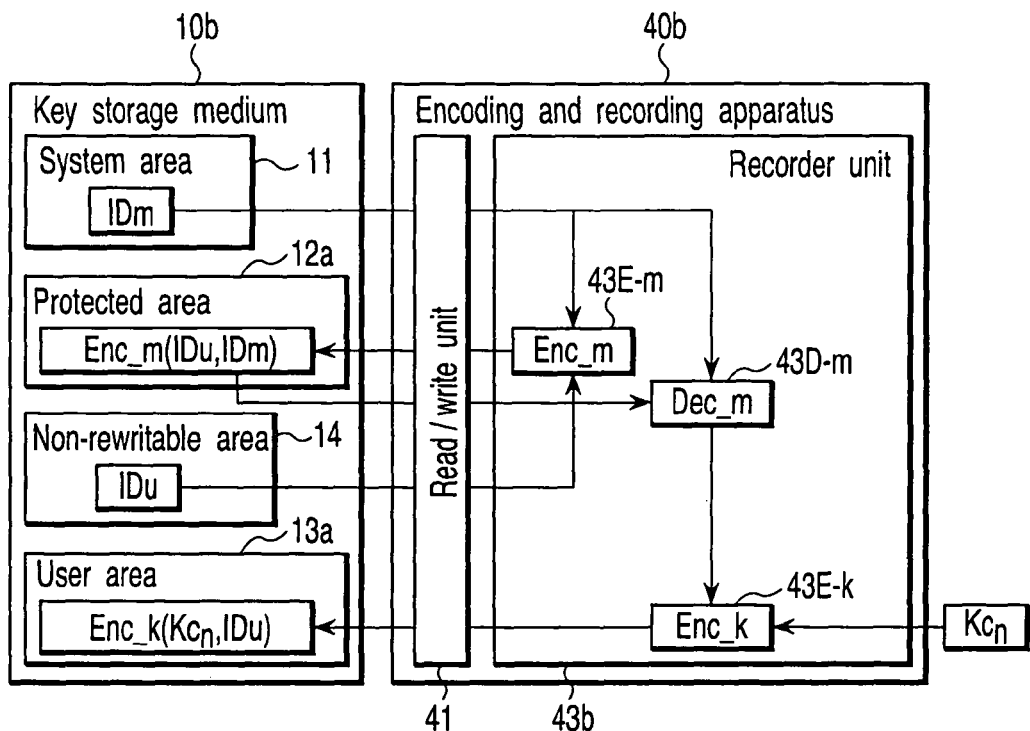
FIG. 3 is a schematic diagram showing a configuration of a key storage medium and an encoding and recording apparatus according to a second embodiment of the present invention.

FIG. 3 is a schematic diagram showing a configuration of a key storage medium and an encoding and recording apparatus according to a second embodiment of the present invention.

The embodiment is a modified example of the first embodiment, and uses the key storage medium 10b into which the IC card 30 and the key storage medium 10a are integrated. Note that, as the key storage medium 10b, for example, an SDX card can be applied.

On the other hand, in accordance therewith, an encoding storage medium 40b is configured such that the read unit 42 of the IC card 30 is omitted, and the read/write unit 41 transmits the user identifier $ID_u$ in a non-rewritable area 14 of the key storage medium 10b to the encoding unit 43E\_m.

Further, as a playback apparatus, the playback apparatus 20a described above can be used, and has the interchangeability with the first embodiment.

With a configuration as described above as well, the effect of the first embodiment can be obtained. Further, the convenience of a user can be improved by using the integrated key storage medium 10b.

(Third Embodiment)

Figure 4:
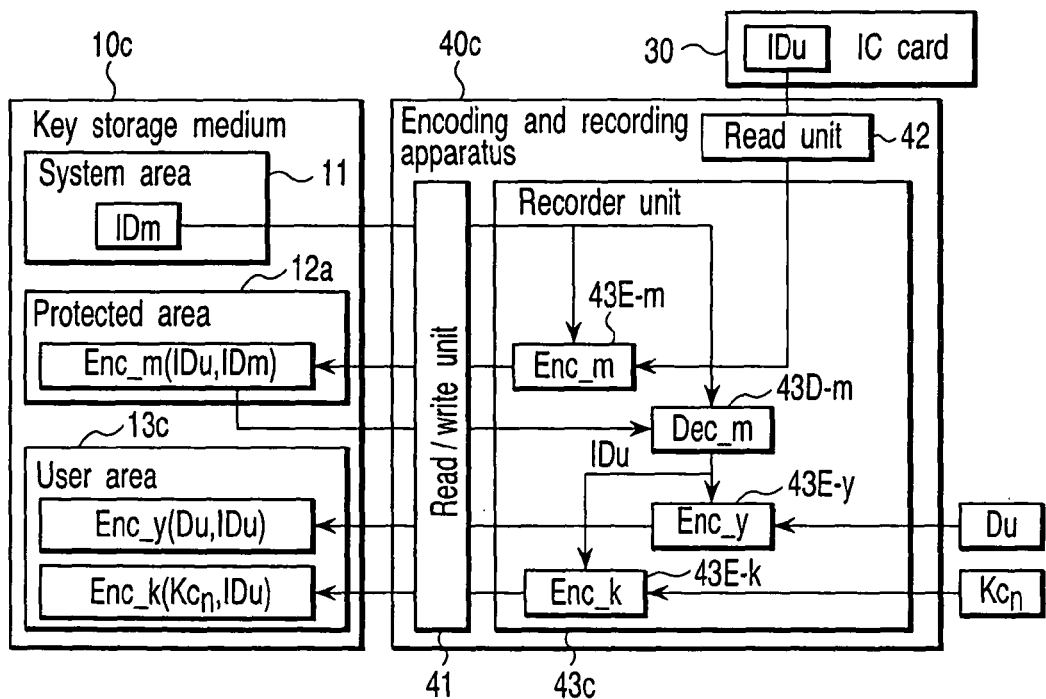
FIG. 4 is a schematic diagram showing a configuration of an encoding and recording apparatus and a key storage medium according to a third embodiment of the present invention.
Figure 5:
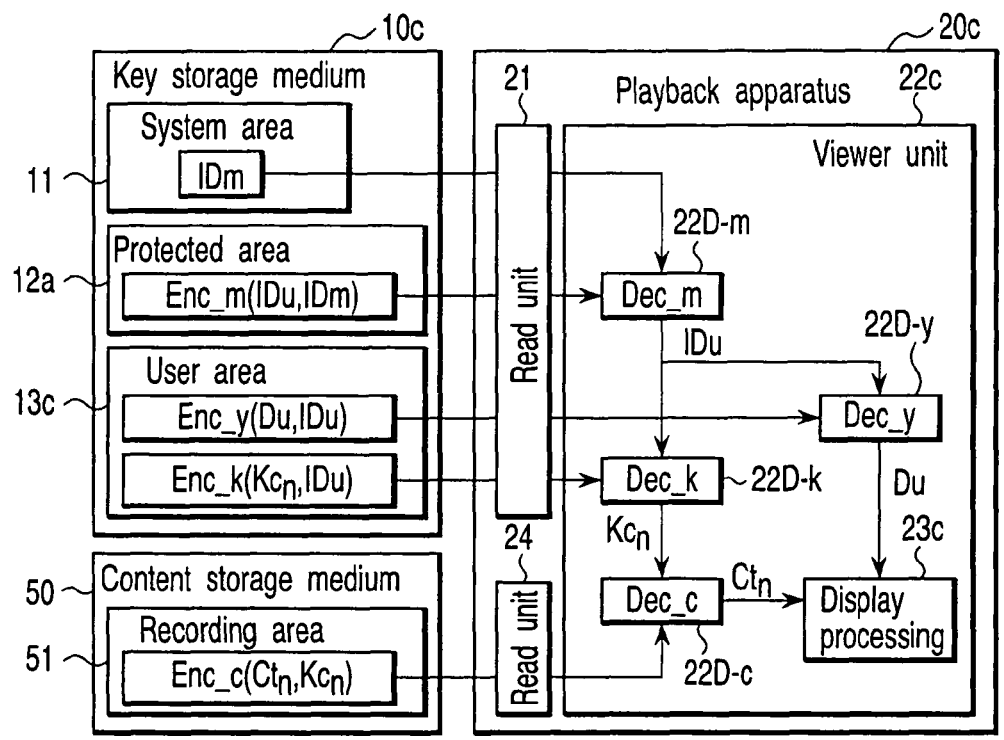
FIG. 5 is a schematic diagram showing a configuration of the key storage medium, a content storage medium, and a playback apparatus in the embodiment.

FIG. 4 is a schematic diagram showing a configuration of an encoding and recording apparatus and a key storage medium according to a third embodiment of the present invention, and FIG. 5 is a schematic diagram showing a configuration of the key storage medium, a content storage medium, and a playback apparatus in the embodiment.

The embodiment is a modified example of the first embodiment, and the content of display processing are changed by using the user attribute information Du. Specifically, a function of encoding and recording the user attribute information Du in a user area 13c of a key storage medium 10c is added in advance to an encoding and recording apparatus 40c, and a function of changing display processing for an playback apparatus 20c in accordance with the user attribute information Du decoded and obtained from the key storage medium 10c is added to the playback apparatus 20c.

To describe in detail, an encoding unit 43E-y with an encoding method y is added to a recorder unit 43c of the encoding and recording apparatus 40c as compared with the recorder unit 43a described above.

Here, the encoding unit 43E-y has a function of encoding the user attribute information Du input from the exterior to be temporarily maintained in a memory on the basis of the user identifier $ID_u$ received from the decoding unit 43D-m, and of writing the maintained encoded user attribute information $Enc\_y(Du, ID_u)$ in the user area 13c of the key storage medium 10c via the read/write unit 41.

Note that, as the user attribute information Du, for example, membership type information such as a general membership or a special membership, individual attributes such as a name, an age, and an address can be used.

On the other hand, a decoding unit 22D-y with an encoding method y is added to a viewer 22c of the playback apparatus 20c as compared with the viewer 22a described above.

Here, the decoding unit 22D-y has a function of decoding the encoded user attribute information $Enc\_y(Du, ID_u)$ read out of the user area 13c of the key storage medium 10c by the read unit 21 to be temporarily maintained in a memory on the basis of the user identifier $ID_u$ received from the decoding unit 22D-m, and of transmitting the maintained user attribute information Du to a display processing unit 23c.

The display processing unit 23c has, in addition to the function of the display processing unit 23 described above, a function of changing the content of display processing of the content data $Ct_n$ received from the decoding unit 22D-c on the basis of the user attribute information Du received from the decoding unit 22D-y.

Note that, as the content of display processing, for example, an ON/OFF control such that display processing for the content data $Ct_n$ is executed/is not executed, or the like can be appropriately used. This type of ON/OFF control can be easily used in accordance with a distinction between membership/non-membership, and a distinction between ages (adult/non-adult), in any case.

In accordance with a configuration as described above, display processing in accordance with the user attribute information Du can be realized in addition to the effect of the first embodiment.

(Fourth Embodiment)

Figure 6:
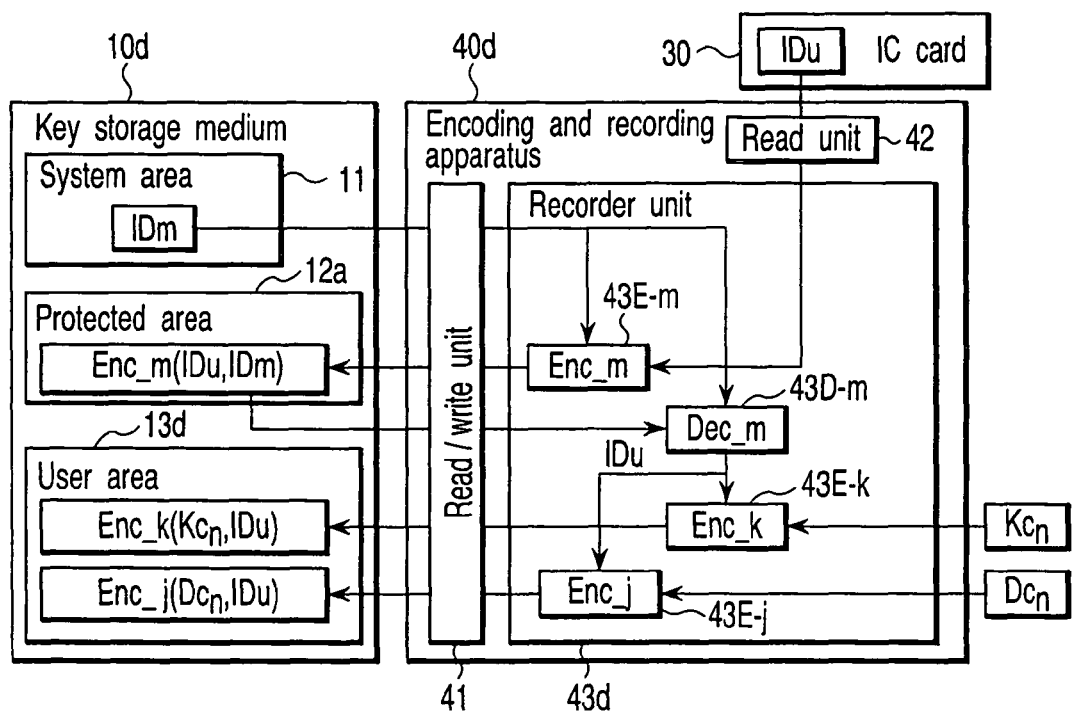
FIG. 6 is a schematic diagram showing a configuration of an encoding and recording apparatus and a key storage medium according to a fourth embodiment of the present invention.

FIG. 6 is a schematic diagram showing a configuration of an encoding and recording apparatus and a key storage medium according to a fourth embodiment of the present invention, and FIG. 7 is a schematic diagram showing a configuration of the key storage medium, a content storage medium, and a playback apparatus in the embodiment.

The present embodiment is a modified example of the third embodiment, and specifically, content attribute information $Dc_n$ is used in place of the attribute information Du. Consequently, at a playback apparatus 20*d*, display processing can be changed in accordance with the content attribute information $Dc_n$.

To described in detail, a recorder unit 43*d* of the encoding and recording apparatus 40*d* has an encoding unit 43E-j with an encoding method j in place of the encoding unit 43E-y of the recorder unit 43*c* described above.

The encoding unit 43E-j has a function of encoding the content attribute information $Dc_n$ input from the exterior to be temporarily maintained in a memory on the basis of the user identifier $ID_u$ received from the decoding unit 43D-m, and of writing the maintained encoded content attribute information Enc_j($Dc_n$, $ID_u$) at a user area 13*d* of a key storage medium 10*d* via the read/write unit 41.

Note that, the content attribute information $Dc_n$ includes, for example, copyright information, contract information, and information on terms of validity of the content.

The information on terms of validity shows, for example, a valid term that display processing may be carried out by the playback apparatus 20*d*, and arbitrary settings such as (d1) valid on and after a certain date, (d2) invalid on and after a certain date, and (d3) valid only between a certain date and another date are possible.

Further, the content attribute information $Dc_n$ may include a display control command.

On the other hand, a viewer unit 22*d* of the playback apparatus 20*d* has a decoding unit 22D-j with an encoding method j in place of the decoding unit 22D-y of the viewer unit 22*c*.

The decoding unit 22D-y has a function of decoding the encoded content attribute information Enc_y ($Dc_n$, $ID_u$) read out of the user area 13*d* of the key storage medium 10*d* by the read unit 21 to be temporarily maintained in a memory on the basis of the user identifier $ID_u$ received from the decoding unit 22D-m, and of transmitting the maintained content attribute information $Dc_n$ to a display processing unit 23*d*.

The display processing unit 23*d* has a function of changing the content of display processing of the content data $Ct_n$ received from the decoding unit 22D-c on the basis of the content attribute information $Dc_n$ received from the decoding unit 22D-y in place of the user attribute information Du, in the function of the display processing unit 23*c* described above. Note that, as the content of display processing, an ON/OFF control based on a current date and time (time display control) and the like can be used.

With a configuration as described above as well, display processing in accordance with the content attribute information $Dc_n$ can be realized in addition to the effect of the first embodiment.

Further, the present embodiment may be modified so as to carry out, not only display processing according to the information on terms of validity in the case where the content attribute information Du includes the information on terms of validity, but also display processing according to the display control command in the case where the content attribute information Du includes a display control command.

(Fifth Embodiment)

Figure 9:
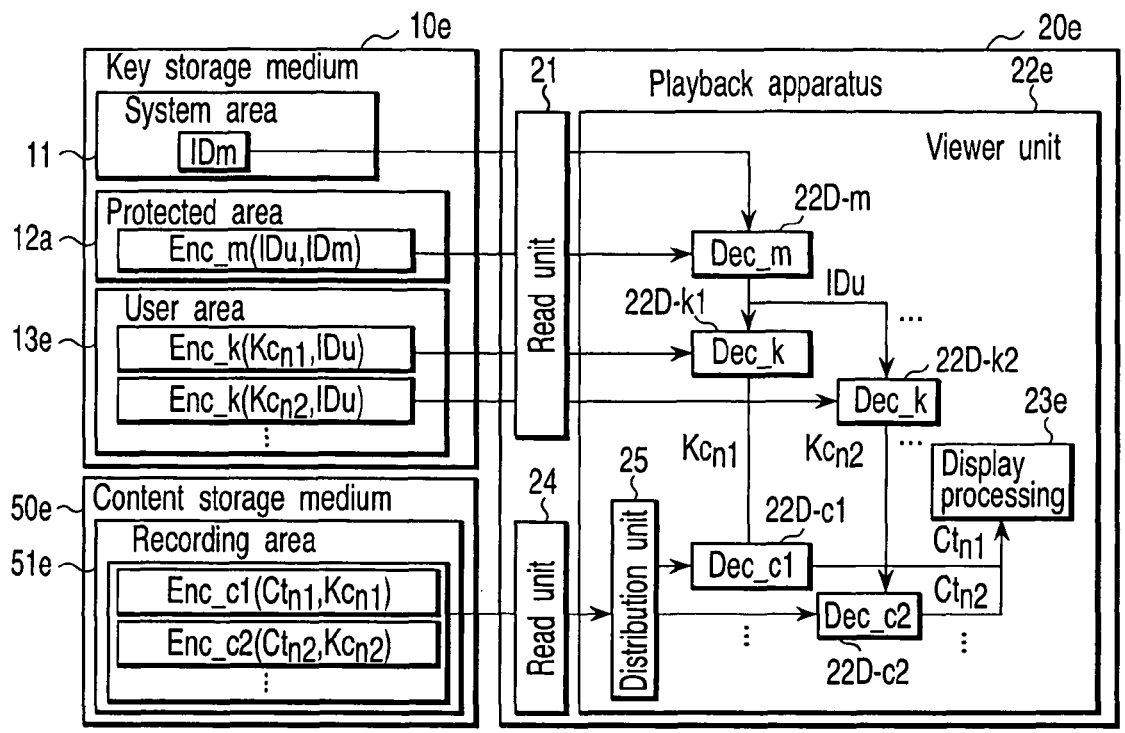
FIG. 9 is a schematic diagram showing a configuration of the key storage medium, a content storage medium, and a playback apparatus in the embodiment.

FIG. 8 is a schematic diagram showing a configuration of an encoding and recording apparatus and a key storage medium according to a fifth embodiment of the present invention, and FIG. 9 is a schematic diagram showing a configuration of the key storage medium, a content storage medium, and a playback apparatus in the embodiment.

The present embodiment is a modified example of the first embodiment, and an encoding method (encoding and decoding functions, and/or a key length of a content key) is changed for each arbitrary portion of the same content data.

Specifically, in place of one encoding unit 43E-k (one time encoding processing) at the encoding and recording apparatus 40*a* of FIG. 1, a plurality of encoding units 43E-k (which may be plural time encoding processings by one encoding unit) and one synthesis unit 44 are provided as shown in FIG. 8.

The respective encoding units 43E-k have a function of respectively encoding respective content keys $Kc_{n1}$, $Kc_{n2}$, ... received from the exterior to be temporarily maintained in a memory on the basis of the user identifier $ID_u$ received from the decoding unit 43D-m, and of transmitting the maintained respective encoded content keys Enc_k($Kc_{n1}$, $ID_u$), Enc_k($Kc_{n2}$, $ID_u$), ... to the synthesis unit 44.

The synthesis unit 44 has a function of synthesizing the respective encoded content keys received from the respective encoding units 43E-k, and of writing the obtained synthesized results as the encoded content key synthesis data {Enc-k($Kc_{n1}$, $ID_u$), Enc_k($Kc_{n2}$, $ID_u$), ... , into a user area 13*e* of a key storage medium 10*e* via the read/write unit 41.

On the other hand, in accordance therewith, a content storage medium 50*e* is a medium in which encoded content synthesis data {Enc_c1($Ct_{n1}$, $Kc_{n1}$), Enc_c2($Ct_{n2}$, $Kc_{n2}$), ... } which are formed due to the encoded content $Ct_{n1}$, $Ct_{n2}$, ... of the respective portions being encoded by the respective encoded content keys, and due to the respective encoded results being synthesized are recorded at a recording area 51*e*.

Further, in place of one decoding unit 22D-c (one time decoding processing) shown in FIG. 2, the playback apparatus 20*e* includes a plurality of decoding units 22D-c1, 22D-c2, ... with an encoding method k (which may be plural time decoding processings at one decoding unit), a plurality of decoding units 22D-c1, 22D-c2, ... with an encoding method c (which may be plural time decoding processings at one decoding unit), and one distribution unit 25 as shown in FIG. 9.

The respective decoding units 22D-k1, 22D-k2, ... respectively have a function of decoding respective encoded content keys Enc_k($Kc_{n1}$, $ID_u$), Enc_k($Kc_{n2}$, $ID_u$), ... received from the read unit 21 to be temporarily maintained in a memory on the basis of the user identifier $ID_u$ received from the decoding unit 22D-m, and of transmitting the maintained respective content keys $Kc_{n1}$, $Kc_{n2}$, ... , to the respective decoding units 22D-c1, 22D-c2, ... .

The distribution unit 25 has a function of classifying the encoded content synthesis data {Enc_c1($Ct_{n1}$, $Kc_{n1}$), Enc_c2($Ct_{n2}$, $Kc_{n2}$), ... } read out of the content storage medium 50*e* via the read unit 24, into respective content data, and of respectively transmitting the obtained respective encoded content data Enc_c1($Ct_{n1}$, $Kc_{n1}$), Enc_c2($Ct_{n2}$, $Kc_{n2}$), ... , to the respective decoding units 22D-c1, 22D-c2, ... .

The respective decoding units 22D-c1, 22D-c2, ... respectively have a function of decoding the respective encoded content data Enc_c1($Ct_{n1}$, $Kc_{n1}$), Enc_c2($Ct_{n2}$, $Kc_{n2}$), ...

received from the distribution unit 25 to be temporarily maintained in a memory on the basis of the respective content keys $Kc_{n1}$, $Kc_{n2}$, . . . received from the respective decoding units 22D-k1, 22D-k2, . . . , and of transmitting the maintained respective content data $Ct_{n1}$, $Ct_{n2}$, . . . , to a display processing unit 23e.

The display processing unit 23e is to process to display the respective content data $Ct_{n1}$, $Ct_{n2}$, . . . received from the respective decoding units 22D-c1, 22D-c2, . . . .

Accordingly, in accordance with a configuration as described above, the key lengths of the respective content keys $Kc_{n1}$, $Kc_{n2}$, . . . , or the like are made values different from one another, and the respective portions of the content data can be encoded at encoding strengths different from one another in addition to the effect of the first embodiment. Therefore, for example, yet stronger encoding processing can be applied to portions of the content data which are thought of as more important.

Further, by setting a content key to be given and a content key to be not given for each user, portions of the content which can be played back can be flexibly set.

Figure 10:
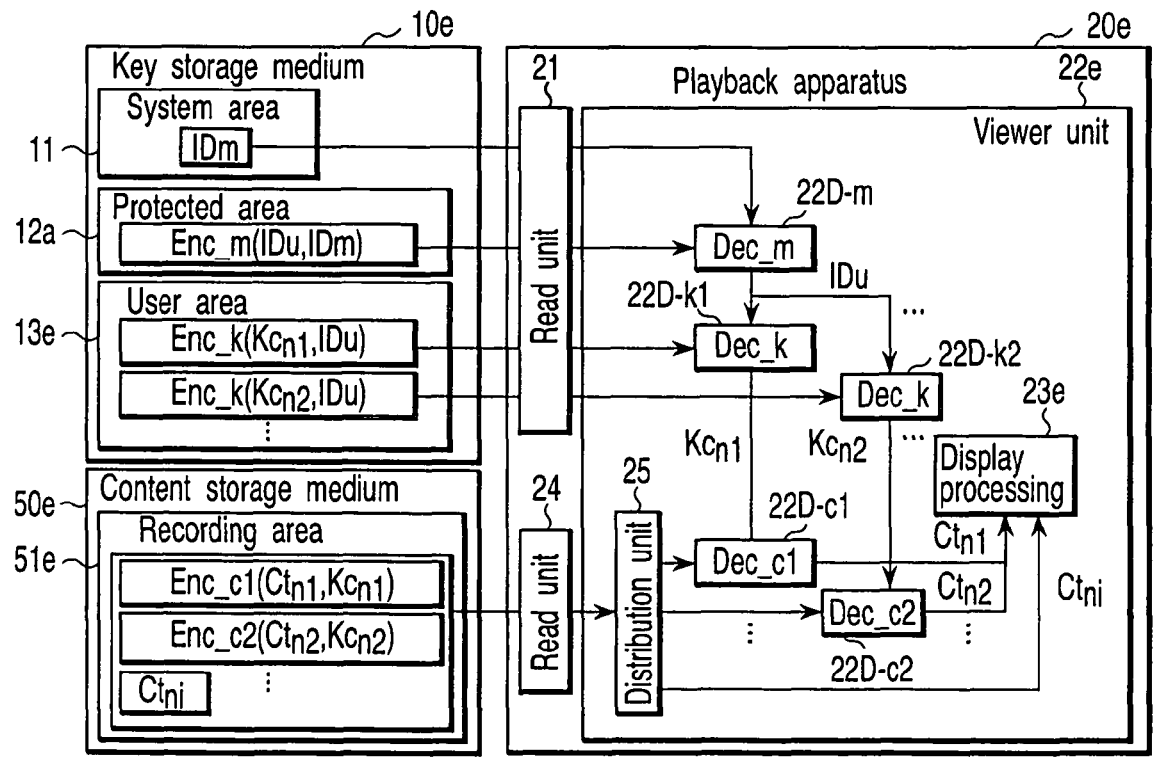
FIG. 10 is a schematic diagram for explanation of a modified example in the embodiment.

For example, as shown in FIG. 10, the present embodiment is not limited to the case where all the portions of the content are encoded, but, portions of plaintexts ($Ct_{ni}$) which have been encoded can be provided. The content data $Ct_{ni}$ of the portions of plaintexts are transmitted to the display processing unit 23e directly from the distribution unit 25 (without through the decoding units), and for example, content expressing an outline or an introduction of the entire content can be used.

(Sixth Embodiment)

Sixth to tenth embodiments are modified examples in which the encoding and recording apparatus and the playback apparatus in the first to fifth embodiments are respectively integrated. This type of modified example can be applied to, not only the first to fifth embodiments, but also all the embodiments including an eleventh embodiment which will be described later on and after in the same way. However, in the following sixth to tenth embodiments, examples applied to the first to fifth embodiments will be representatively described.

Figure 11:
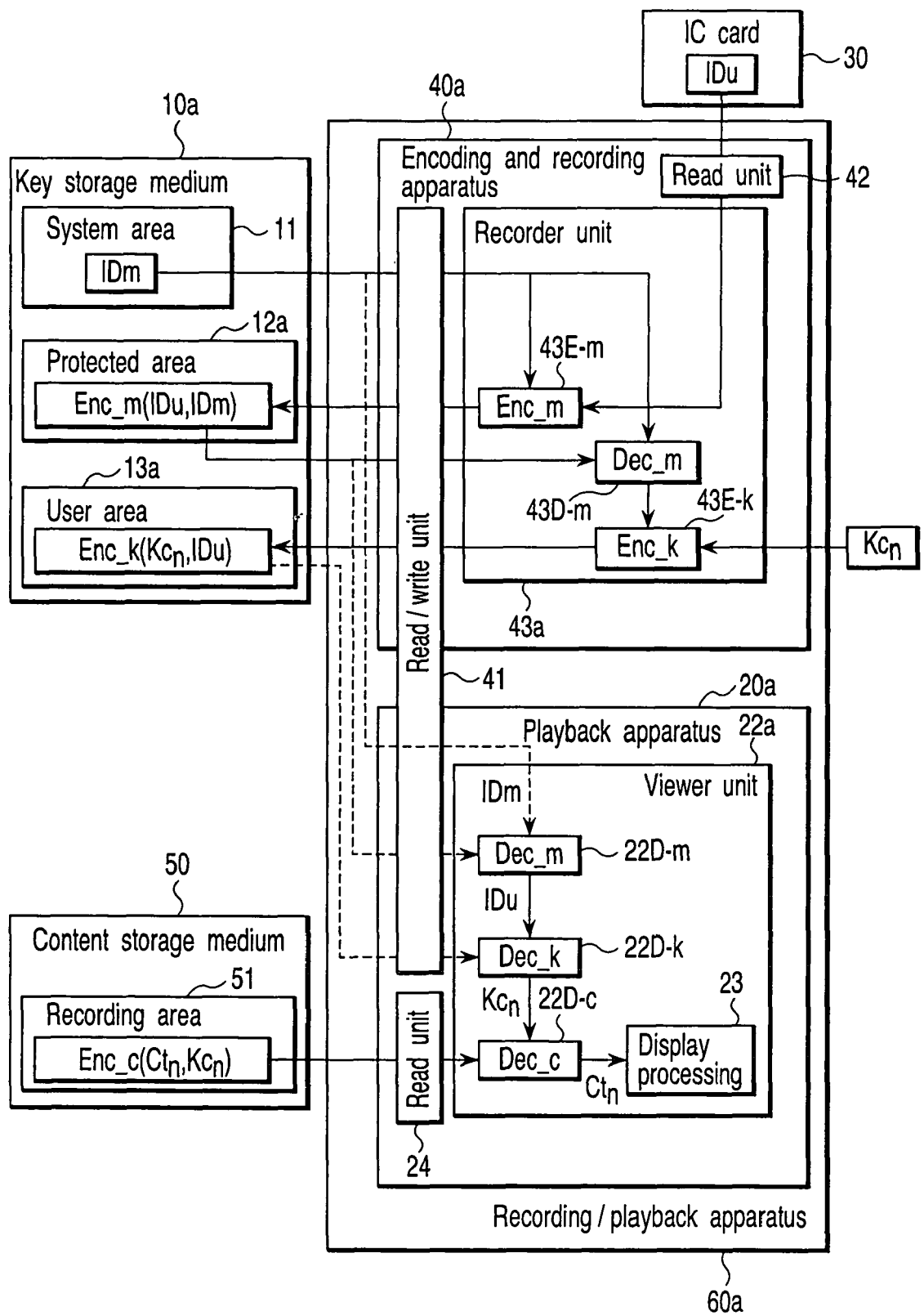
FIG. 11 is a schematic diagram showing a configuration of a recording/playback apparatus according to a sixth embodiment of the present invention.

FIG. 11 is a schematic diagram showing a configuration of a recording/playback apparatus according to a sixth embodiment of the present invention. The present embodiment is a modified example of the first embodiment, and has a recording/playback apparatus 60a into which the encoding and recording apparatus 40a and the playback apparatus 20a are integrated.

With the above configuration as well, the effect of the first embodiment can be obtained, and moreover, a user can appropriately write the user identifier $ID_u$ into the key storage medium 10a.

(Seventh Embodiment)

Figure 12:
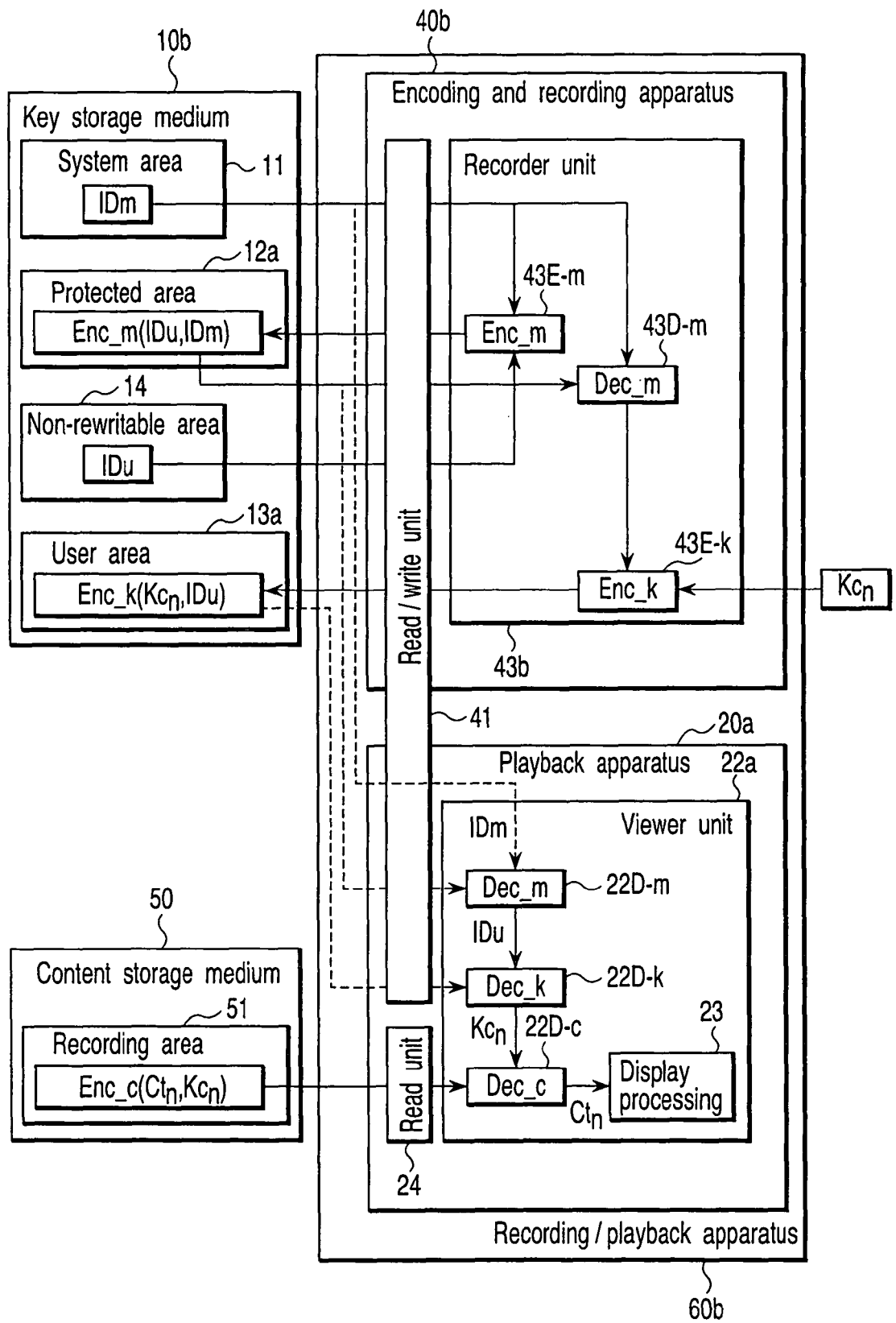
FIG. 12 is a schematic diagram showing a configuration of a recording/playback apparatus according to a seventh embodiment of the present invention.

FIG. 12 is a schematic diagram showing a configuration of a recording/playback apparatus according to a seventh embodiment of the present invention. The present is a modified example of the second embodiment, and has a recording/playback apparatus 60b into which the encoding and recording apparatus 40b and the playback apparatus 20a are integrated.

Also with the configuration as described above, the effect of the second embodiment can be obtained.

(Eighth Embodiment)

FIG. 13 is a schematic diagram showing a configuration of a recording/playback apparatus according to an eighth embodiment of the present invention. The embodiment is a modified example of the third embodiment, and has a recording/playback apparatus 60c into which the encoding and recording apparatus 40c and the playback apparatus 20c are integrated.

Also with the configuration as described above, the effect of the third embodiment can be obtained, and moreover, a user can appropriately write the user identifier $ID_u$ and user attribute information Du into the key storage medium 10c.

In accordance therewith, for example, a usage such that an introduction text of the content is added to the user attribute information Du (the user attribute information Du itself is not rewritten), and is recorded again can be realized.

(Ninth Embodiment)

FIG. 14 is a schematic diagram showing a configuration of a recording/playback apparatus according to a ninth embodiment of the present invention. The embodiment is a modified example of the fourth embodiment, and has a recording/playback apparatus 60d into which the encoding and recording apparatus 40d and the playback apparatus 20d are integrated.

With the configuration described above as well, the effect of the fourth embodiment can be obtained, and moreover, a user can appropriately write the user identifier $ID_u$ and user attribute information $Dc_n$ into the key storage medium 10d.

In accordance therewith, for example, a usage, for example, such that a user himself/herself adds "bookmark information" to an arbitrary place of the content attribute information $Dc_n$ (the content data $Ct_n$ itself is not rewritten), and records it again can be realized.

(Tenth Embodiment)

Figure 15:
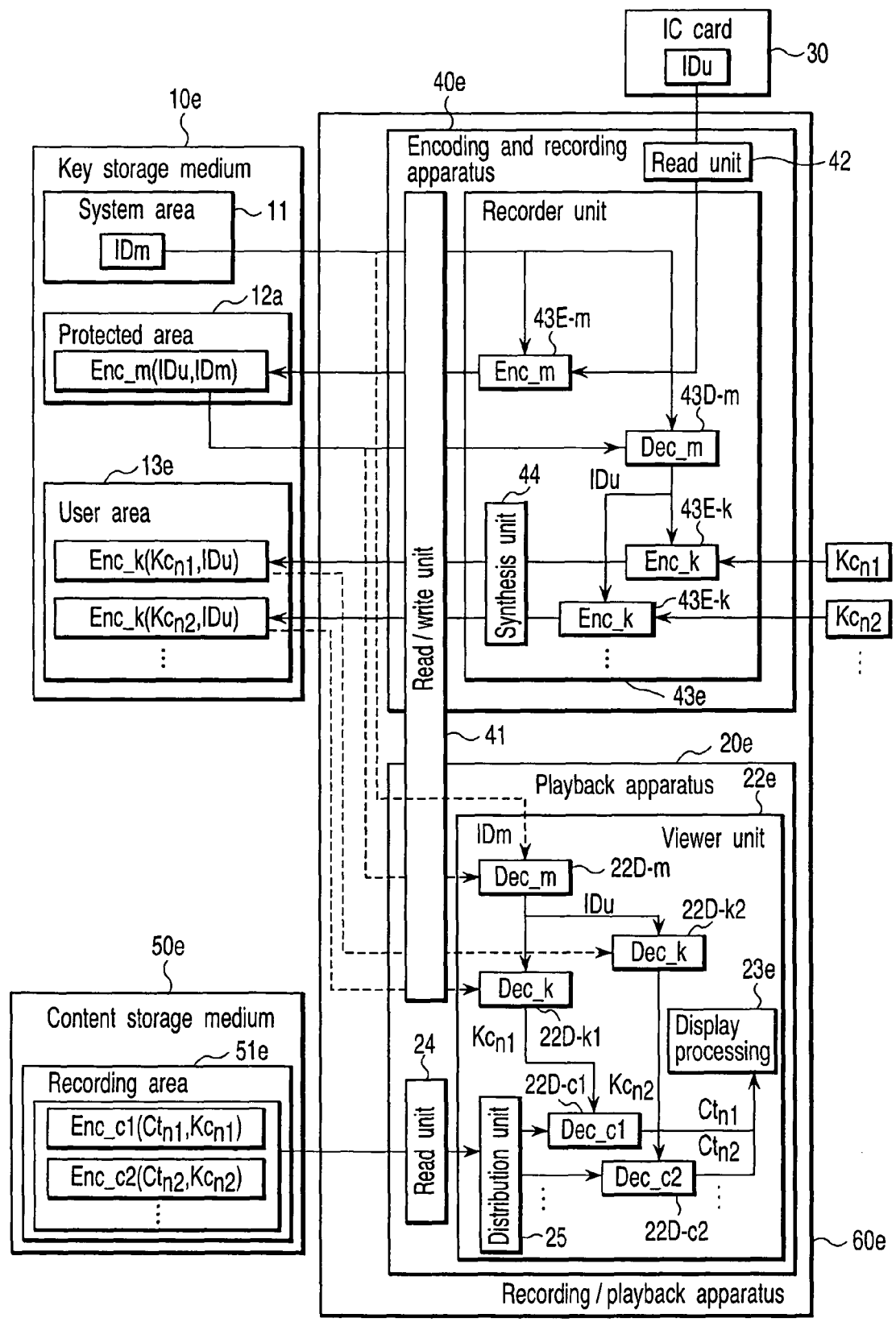
FIG. 15 is a schematic diagram showing a configuration of a recording/playback apparatus according to a tenth embodiment of the present invention.

FIG. 15 is a schematic diagram showing a configuration of a recording/playback apparatus according to a tenth embodiment of the present invention. The embodiment is a modified example of the fifth embodiment, and has a recording/playback apparatus 60e into which the encoding and recording apparatus 40e and the playback apparatus 20e are integrated.

Also with the above configuration, the effect of the fifth embodiment can be obtained, and moreover, a user can appropriately write the user identifier $ID_u$ into the key storage medium 10e. Further, in the same way as described above, the embodiment can be applied to the encoded content including portions of plaintexts as shown in FIG. 16.

(Eleventh Embodiment)

Eleventh to fourteenth embodiments of the present invention are respectively modified examples in which the third to fifth embodiments are combined with one another, and fifteenth to twenty-first embodiments of the present invention are modified examples in which the third to fifth embodiments including the second embodiment are combined with one another. Hereinafter, those will be successively described.

Figure 17:
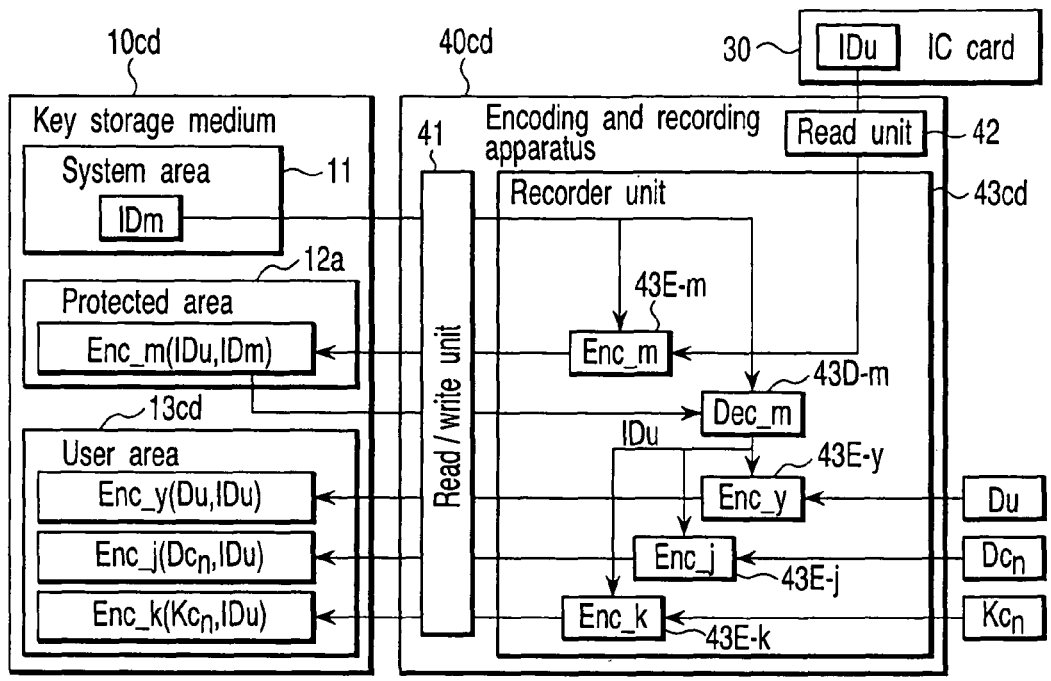
FIG. 17 is a schematic diagram showing a configuration of an encoding and recording apparatus and a key storage medium according to an eleventh embodiment of the present invention.
Figure 18:
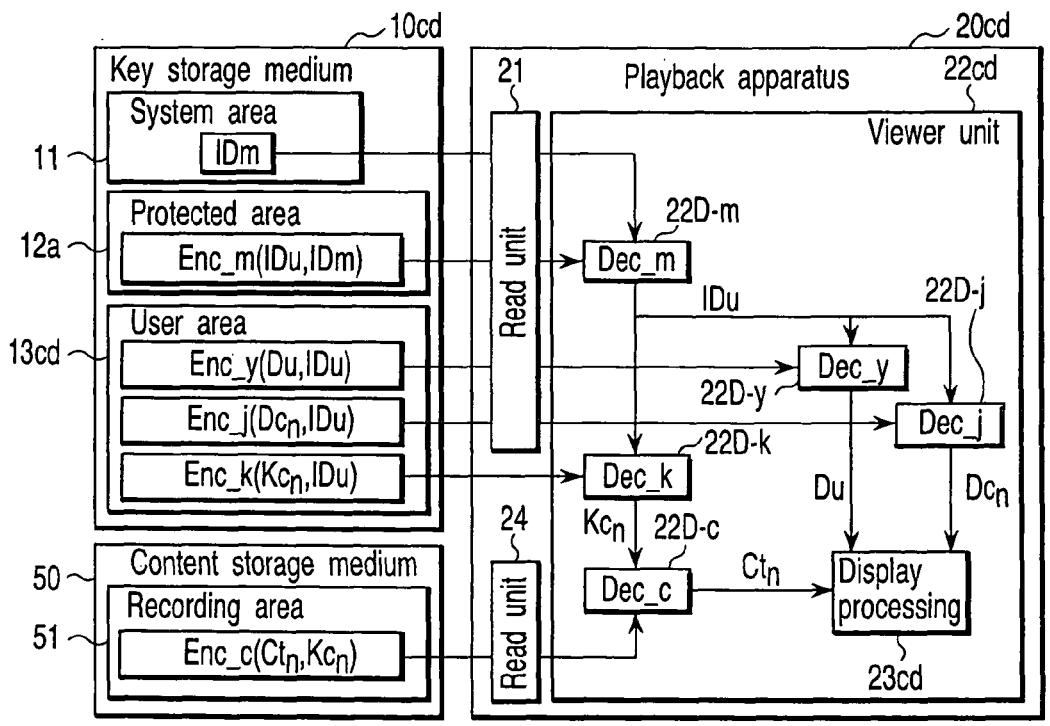
FIG. 18 is a schematic diagram showing a configuration of the key storage medium, a content storage medium, and a playback apparatus in the embodiment.

FIG. 17 is a schematic diagram showing a configuration of an encoding and recording apparatus and a key storage medium according to an eleventh embodiment of the present invention, and FIG. 18 is a schematic diagram showing a configuration of the key storage medium, a content storage medium, and a playback apparatus in the embodiment.

The embodiment is an example of a combination of the third and fourth embodiments, and the content of display processing are changed by using the user attribute information Du and the content attribute information $Dc_n$.

In accordance therewith, a display processing unit 23cd shown in FIG. 18 has display processing functions of the both of display processing units 23c, 23d described above.

According to the configuration as described above, because, in addition to the effects of the third and fourth embodiments, the display processings based on the user attribute information Du and the content attribute information $Dc_n$ are carried out, more precise display control can be realized.

For example, when the display processing by the user attribute information Du is ON/OFF control of which age restrictions are typical, and the display processing by the content attribute information $Dc_n$ is (time) display control of which a display within a valid term is typical, precise display processing such that the conditions of the both can be satisfied can be realized according to the embodiment.

(Twelfth Embodiment)

Figure 19:
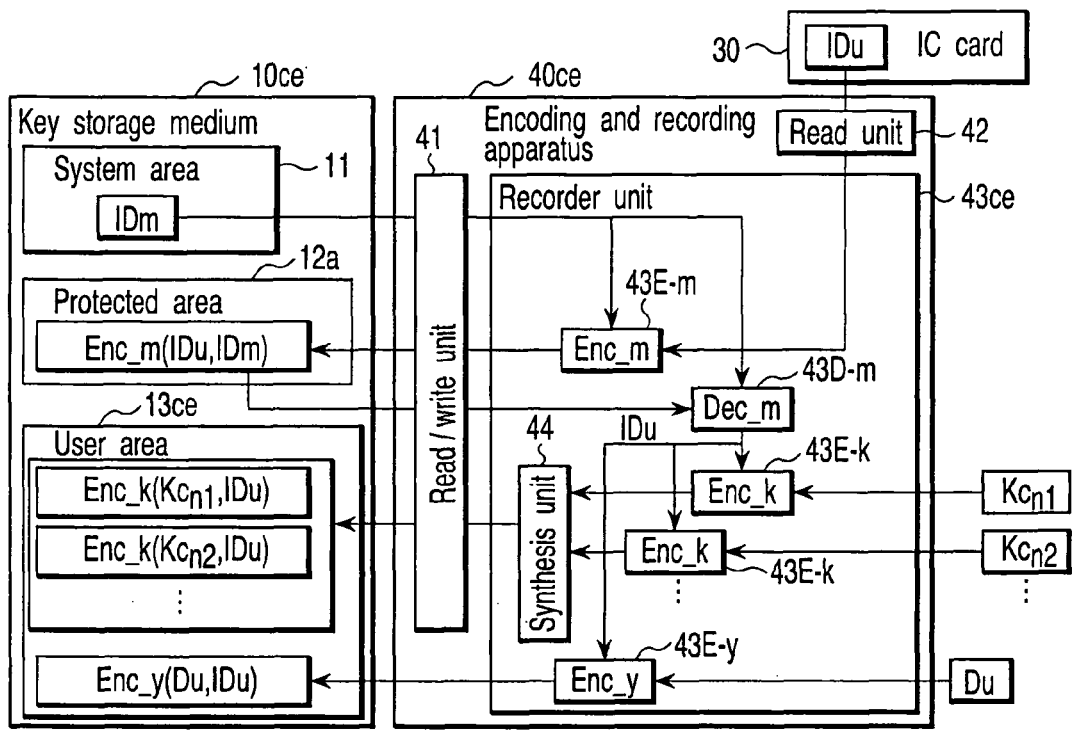
FIG. 19 is a schematic diagram showing a configuration of an encoding and recording apparatus and a key storage medium according to a twelfth embodiment of the present invention.
Figure 20:
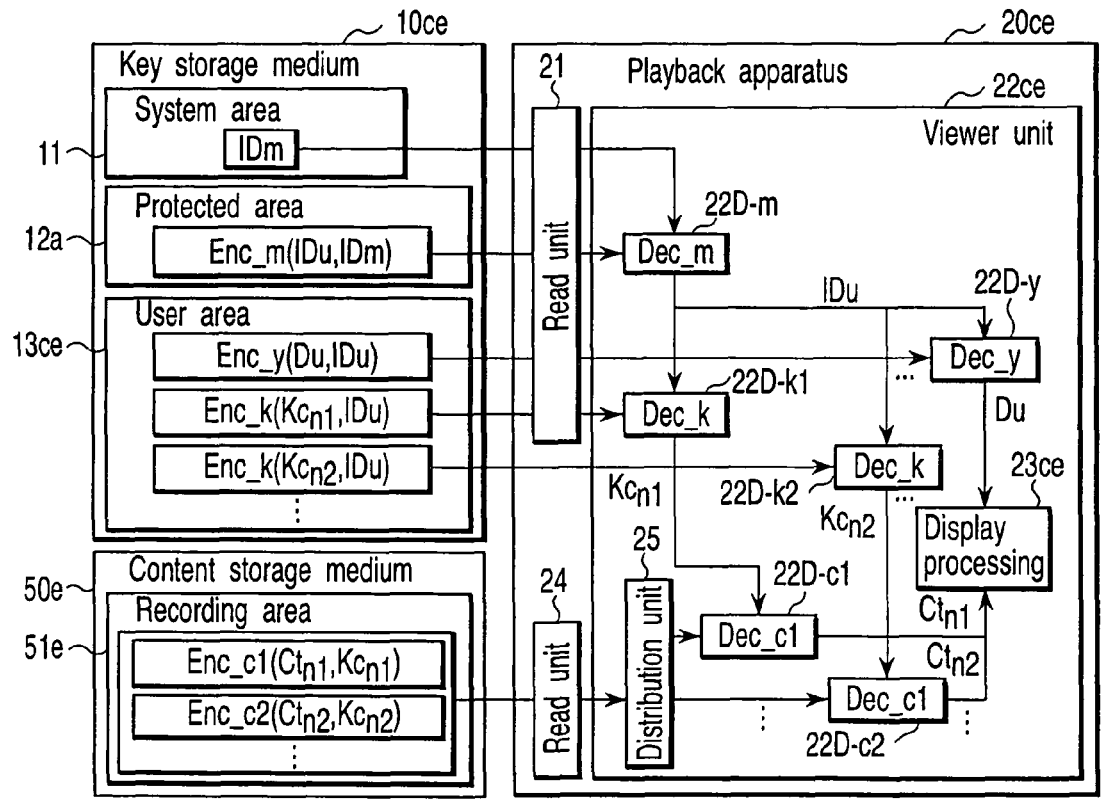
FIG. 20 is a schematic diagram showing a configuration of the key storage medium, a content storage medium, and a playback apparatus in the embodiment.

FIG. 19 is a schematic diagram showing a configuration of an encoding and recording apparatus and a key storage medium according to a twelfth embodiment of the present invention, and FIG. 20 is a schematic diagram showing a configuration of the key storage medium, a content storage medium, and a playback apparatus in the embodiment.

The embodiment is an example of a combination of the third and fourth embodiments, and the content of display processing is changed by using the user attribute information Du, and the encoding strengths can be changed in the same content.

In accordance therewith, a display processing unit 23ce shown in FIG. 20 has display processing functions of the both of display processing units 23c, 23e described above.

With the configuration as described above, the effects of the third and fifth embodiments can be simultaneously obtained.

(Thirteenth Embodiment)

FIG. 21 is a schematic diagram showing a configuration of an encoding and recording apparatus and a key storage medium according to a thirteenth embodiment of the present invention, and FIG. 22 is a schematic diagram showing a configuration of the key storage medium, a content storage medium, and a playback apparatus in the embodiment.

The embodiment is an example of a combination of the fourth and fifth embodiments, and the content of display processing is changed by using the content attribute information $Dc_n$, and the encoding strengths can be changed in the same content.

In accordance therewith, a display processing unit 23de shown in FIG. 22 has display processing functions of the both of display processing units 23d, 23e described above.

With the above-described configuration, the effects of the fourth and fifth embodiments can be simultaneously obtained.

(Fourteenth Embodiment)

Figure 23:
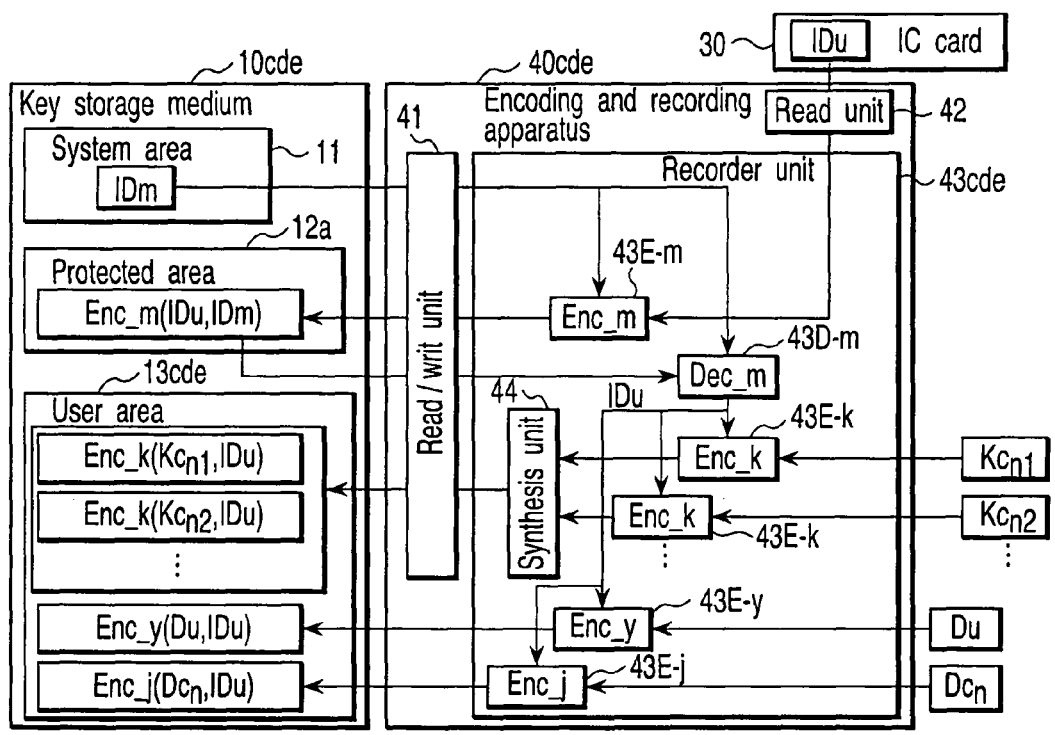
FIG. 23 is a schematic diagram showing a configuration of an encoding and recording apparatus and a key storage medium according to a fourteenth embodiment of the present invention.
Figure 24:
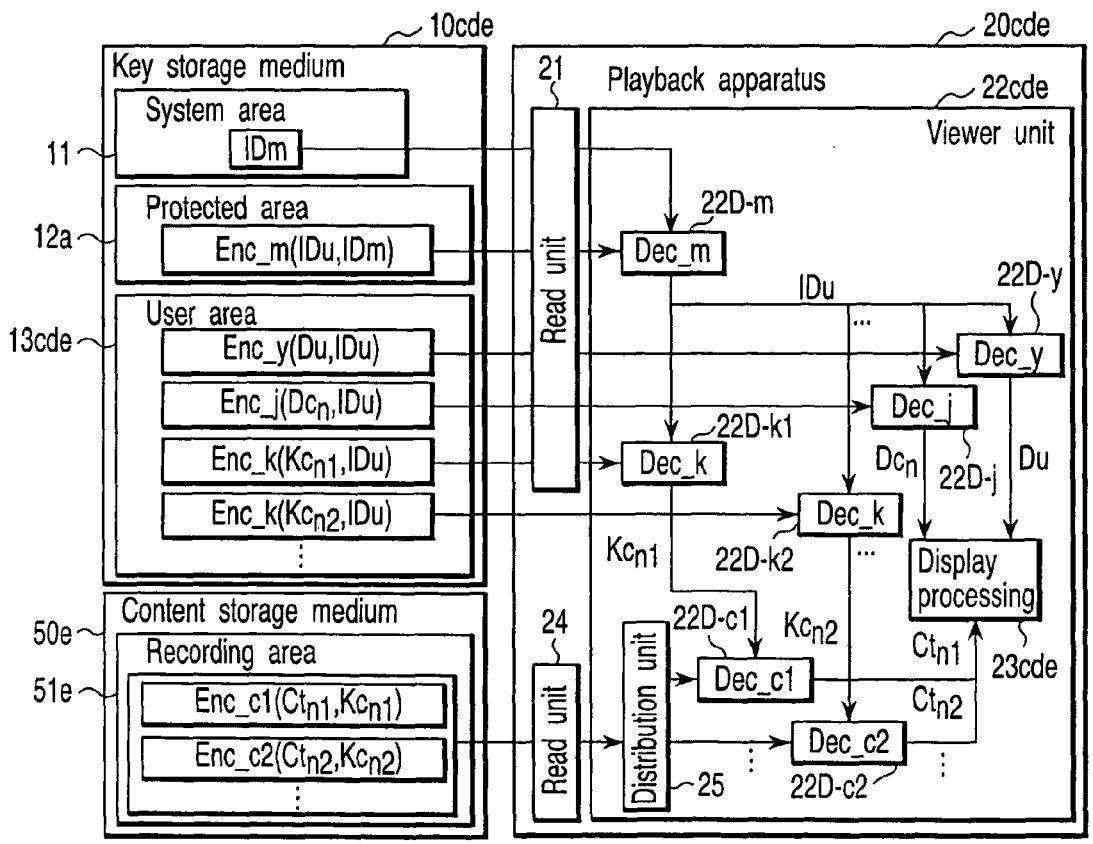
FIG. 24 is a schematic diagram showing a configuration of the key storage medium, a content storage medium, and a playback apparatus in the embodiment.

FIG. 23 is a schematic diagram showing a configuration of an encoding and recording apparatus and a key storage medium according to a fourteenth embodiment of the present invention, and FIG. 24 is a schematic diagram showing a configuration of the key storage medium, a content storage medium, and a playback apparatus in the embodiment.

The embodiment is an example of a combination of the third to fifth embodiments, and the content of display processing is changed by using the user attribute information Du and the content attribute information $Dc_n$, and the encoding strengths can be changed in the same content.

In accordance therewith, a display processing unit 23cde shown in FIG. 24 has display processing functions of the both of display processing units 23c, 23d, 23e described above.

With the configuration as described above, the effects of the third to fifth embodiments can be simultaneously obtained.

(Fifteenth Embodiment)

Figure 25:
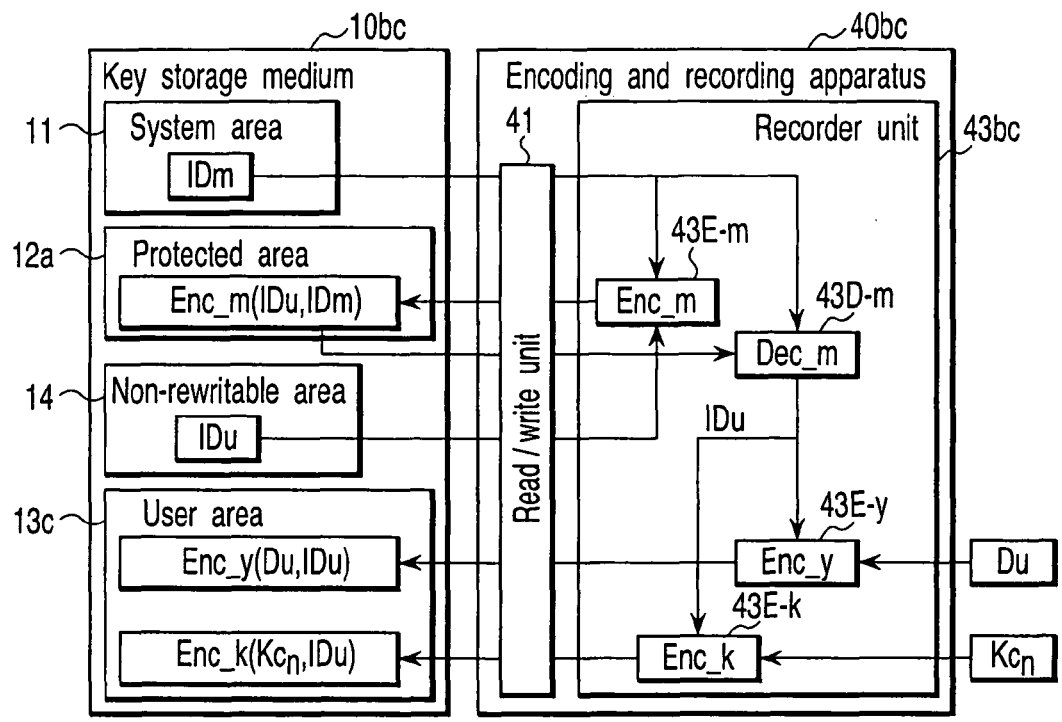
FIG. 25 is a schematic diagram showing a configuration of an encoding and recording apparatus and a key storage medium according to a fifteenth embodiment of the present invention.

FIG. 25 is a schematic diagram showing a configuration of an encoding and recording apparatus and a key storage medium according to a fifteenth embodiment of the present invention.

The present embodiment is an example of a combination of the second and third embodiments, and the user identifier $ID_u$ is built in a key storage medium 10bc, and the content of display processing are changed by using the user attribute information Du. Note that, as a playback apparatus, the playback apparatus 20c shown in FIG. 5 is used.

With the configuration as described above, the effects of the second and third embodiments can be simultaneously obtained.

(Sixteenth Embodiment)

Figure 26:
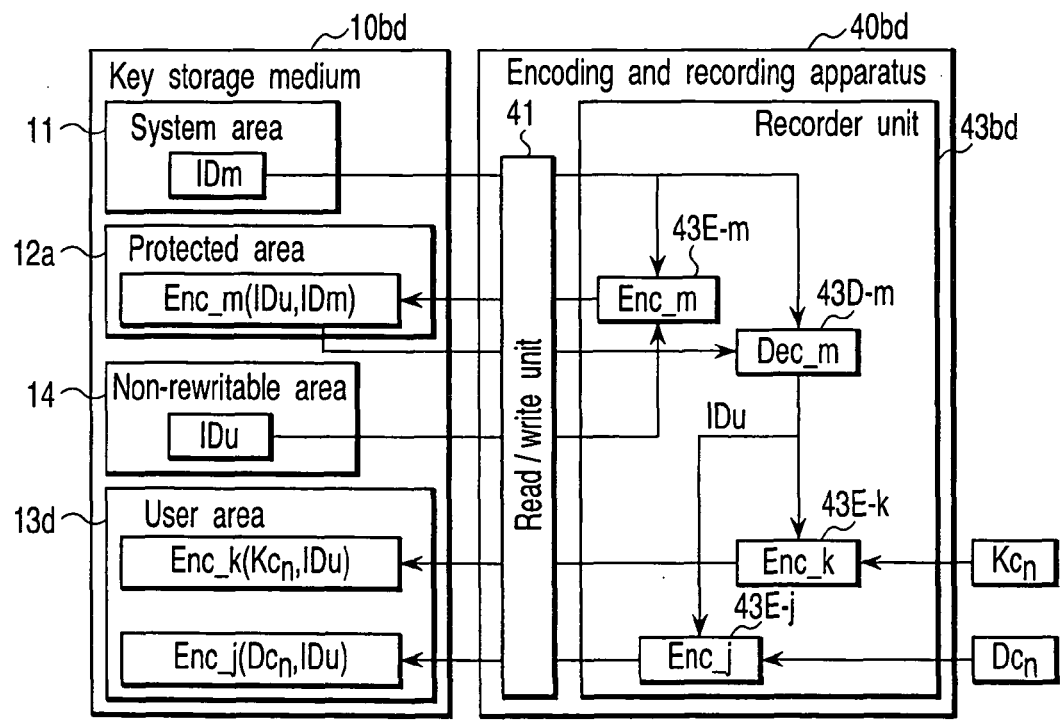
FIG. 26 is a schematic diagram showing a configuration of an encoding and recording apparatus and a key storage medium according to a sixteenth embodiment of the present invention.

FIG. 26 is a schematic diagram showing a configuration of an encoding and recording apparatus and a key storage medium according to a sixteenth embodiment of the present invention.

The embodiment is an example of a combination of the second and fourth embodiments, and the user identifier $ID_u$ is built in a key storage medium 10bd, and the content of display processing can be changed by using the content attribute information $Dc_n$. Note that, as a playback apparatus, the playback apparatus 20d shown in FIG. 7 is used.

With the configuration as described above, the effects of the second and fourth embodiments can be simultaneously obtained.

(Seventeenth Embodiment)

Figure 27:
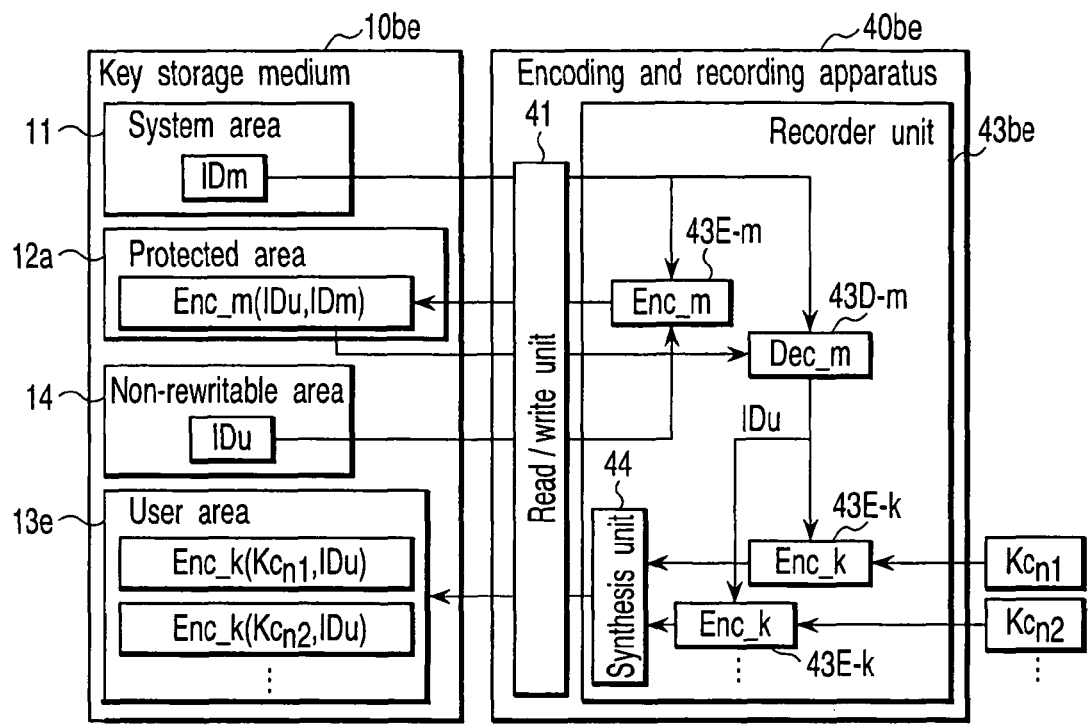
FIG. 27 is a schematic diagram showing a configuration of an encoding and recording apparatus and a key storage medium according to a seventeenth embodiment of the present invention.

FIG. 27 is a schematic diagram showing a configuration of an encoding and recording apparatus and a key storage medium according to a seventeenth embodiment of the present invention.

The embodiment is an example of a combination of the second and fifth embodiments, and the user identifier $ID_u$ is built in a key storage medium 10be, and the encoding strengths can be changed in the same content. Note that, as a playback apparatus, the playback apparatus 20e shown in FIG. 9 is used.

With the configuration as described above, the effects of the second and fifth embodiments can be simultaneously obtained.

(Eighteenth Embodiment)

Figure 28:
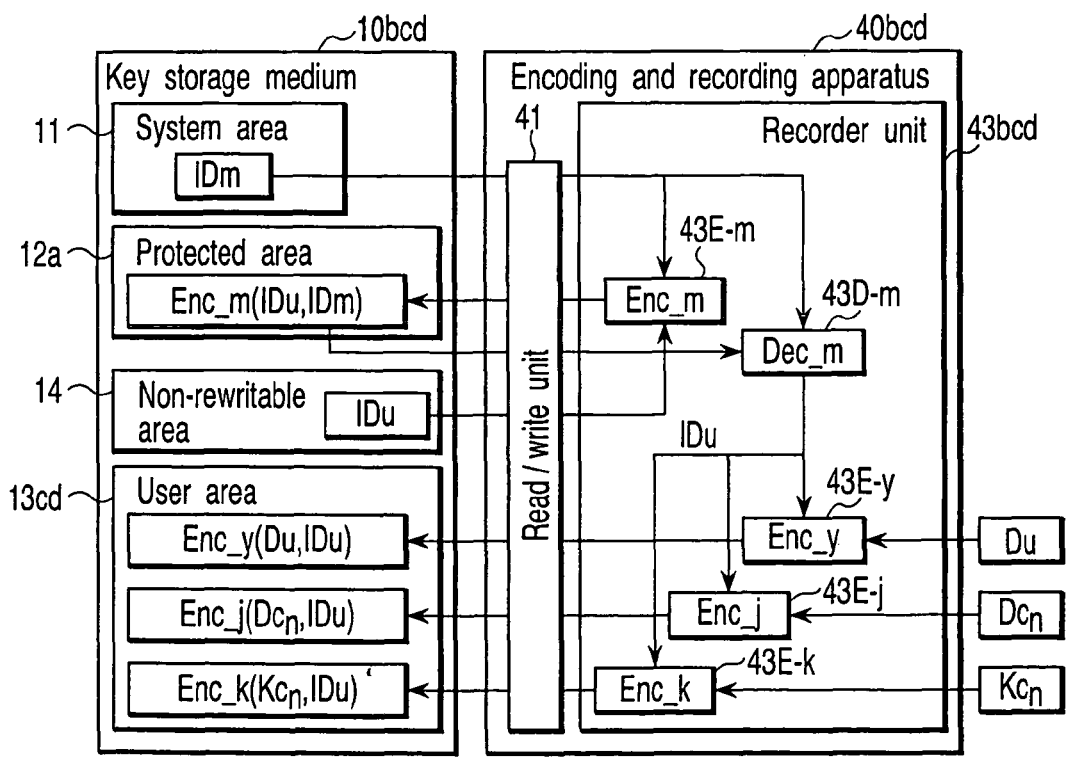
FIG. 28 is a schematic diagram showing a configuration of an encoding and recording apparatus and a key storage medium according to an eighteenth embodiment of the present invention.

FIG. 28 is a schematic diagram showing a configuration of an encoding and recording apparatus and a key storage medium according to an eighteenth embodiment of the present invention.

The present embodiment is an example of a combination of the second to fourth embodiments, and the user identifier $ID_u$ is built in a key storage medium 10bcd, and the content of display processing are changed by using the user attribute information Du and the content attribute information $Dc_n$. Note that, as a playback apparatus, the playback apparatus 20cd shown in FIG. 13 is used.

With the configuration as described above, the effects of the second to fourth embodiments can be simultaneously obtained.

(Nineteenth Embodiment)

Figure 29:
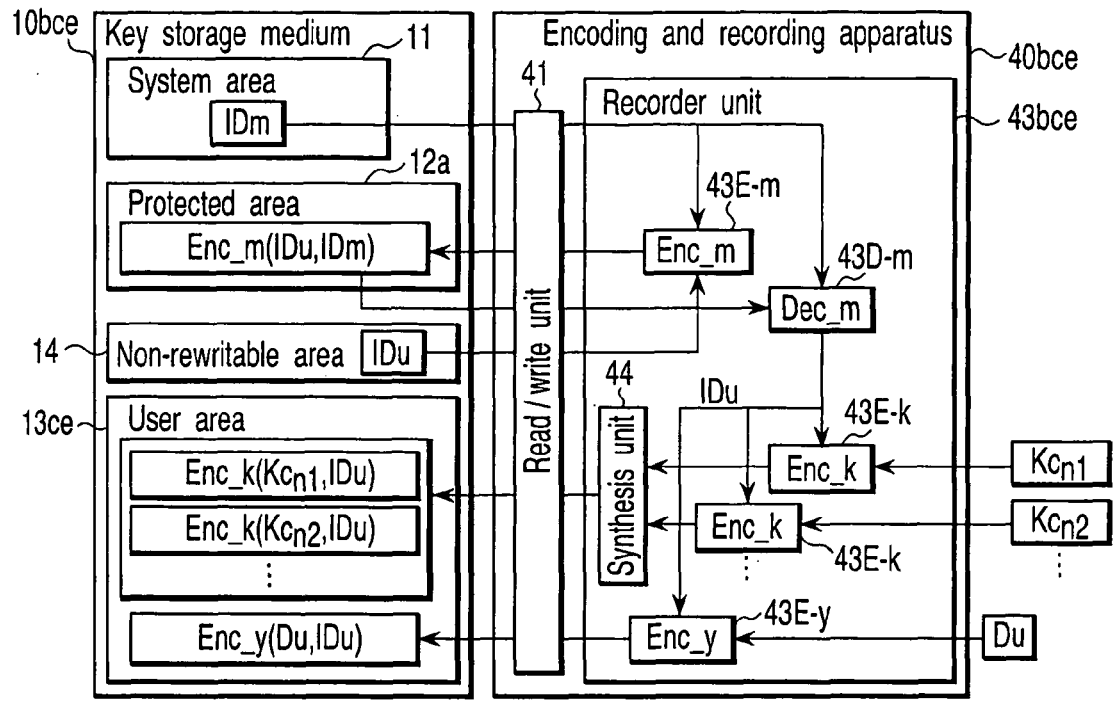
FIG. 29 is a schematic diagram showing a configuration of an encoding and recording apparatus and a key storage medium according to a nineteenth embodiment of the present invention.

FIG. 29 is a schematic diagram showing a configuration of an encoding and recording apparatus and a key storage medium according to a nineteenth embodiment of the present invention.

The embodiment is an example of a combination of the second, third, and fifth embodiments, and the user identifier $ID_u$ is built in a key storage medium 10bce, the content of display processing are changed by using user attribute information Du, and the encoding strengths can be changed in the same content. Note that, as a playback apparatus, a playback apparatus 20ce shown in FIG. 20 is used.

With the configuration as described above, the effects of the second, third, and fifth embodiments can be simultaneously obtained.

(Twentieth Embodiment)

Figure 30:
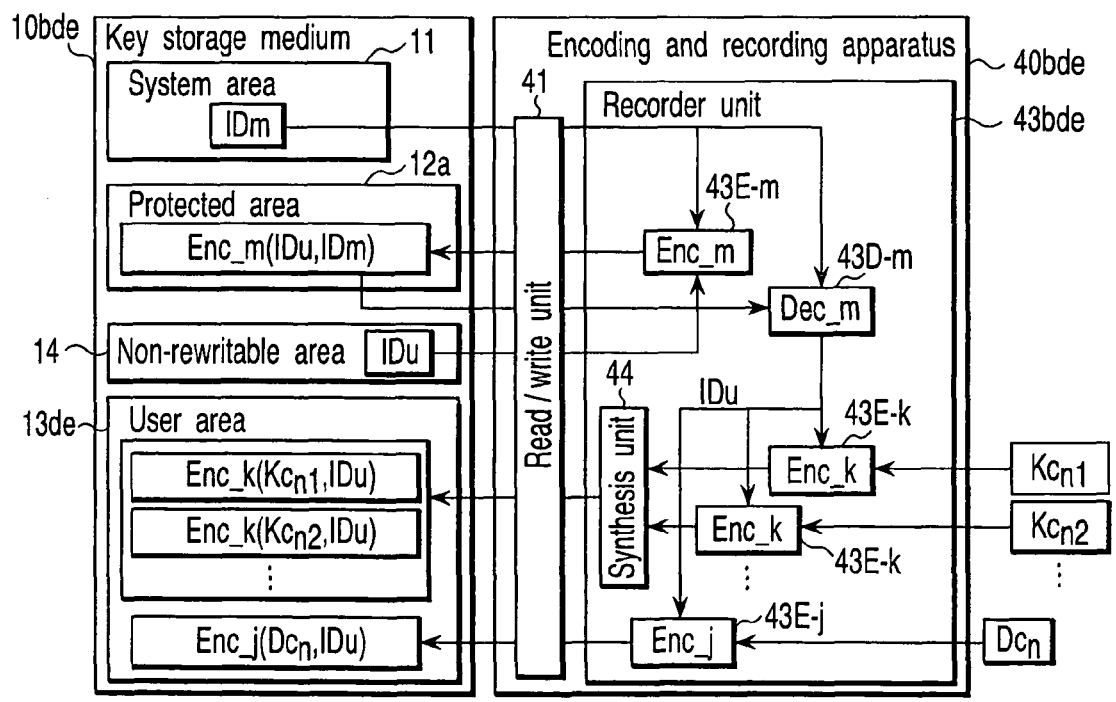
FIG. 30 is a schematic diagram showing a configuration of an encoding and recording apparatus and a key storage medium according to a twentieth embodiment of the present invention.

FIG. 30 is a schematic diagram showing a configuration of an encoding and recording apparatus and a key storage medium according to a twentieth embodiment of the present invention.

The embodiment is an example of a combination of the second, fourth, and fifth embodiments, and the user identifier $ID_u$ is built in the key storage medium 10 bce, the content of display processing is changed by using the content attribute information $Dc_n$, and the encoding strengths can be changed in the same content. Note that, as a playback apparatus, a playback apparatus 20de shown in FIG. 22 is used.

With the configuration as described above, the effects of the second, fourth, and fifth embodiments can be simultaneously obtained.

(Twenty-First Embodiment)

Figure 31:
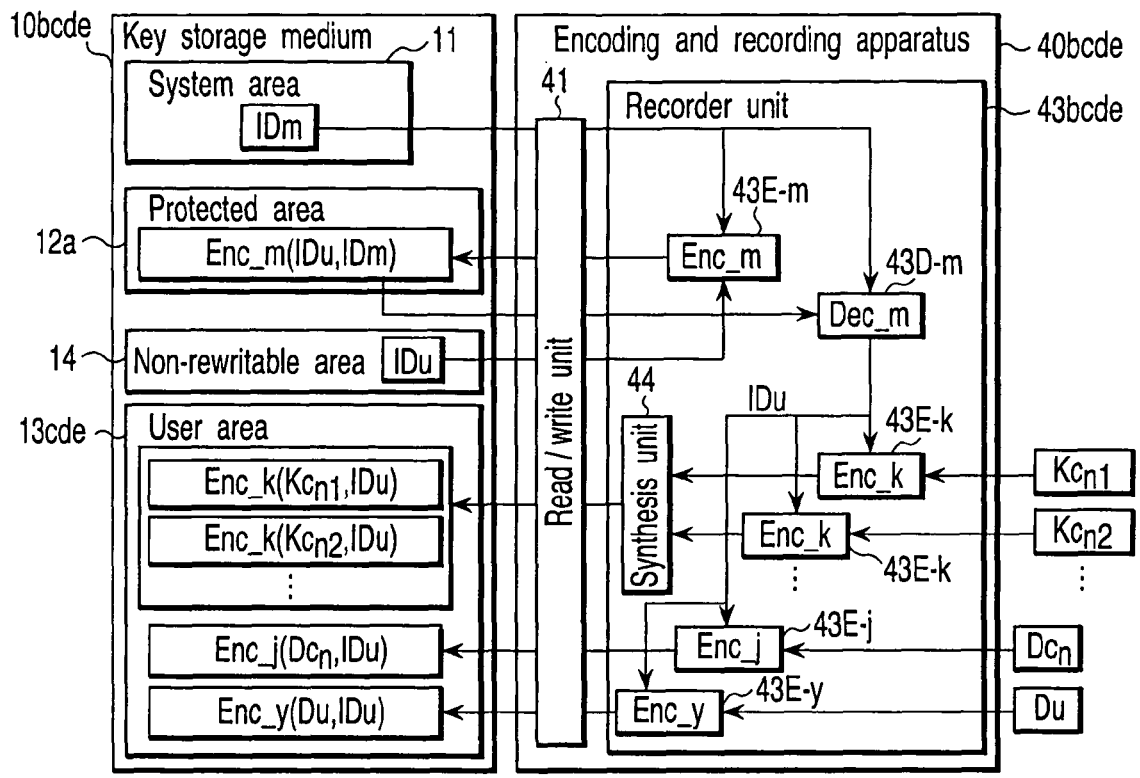
FIG. 31 is a schematic diagram showing a configuration of an encoding and recording apparatus and a key storage medium according to a twenty-first embodiment of the present invention.

FIG. 31 is a schematic diagram showing a configuration of an encoding and recording apparatus and a key storage medium according to a twenty-first embodiment of the present invention.

The embodiment is an example of a combination of the second to fifth embodiments, and the user identifier $ID_u$ is built in the key storage medium 10 bce, the content of display processing is changed by using user attribute information Du and content attribute information $Dc_n$, and the encoding strengths can be changed in the same content. Note that, as a playback apparatus, a playback apparatus 20cde shown in FIG. 24 is used.

With the configuration as described above, the effects of the second through fifth embodiments can be simultaneously obtained.

(Twenty-Second Embodiment)

Twenty-second and twenty-third embodiments of the present invention are respectively modified examples in which a value $h(ID_u)$ obtained by applying a one-way function such as a hash function to the user identifier $ID_u$ is used in place of the user identifier $ID_u$ in the first and second embodiments described above. This type of modified example can be applied to, not only the first and second embodiments, but also all the embodiments described above in the same way. However, in the following twenty-second and twenty-third embodiments, examples applied to the first and second embodiments will be representatively described.

Figure 32:
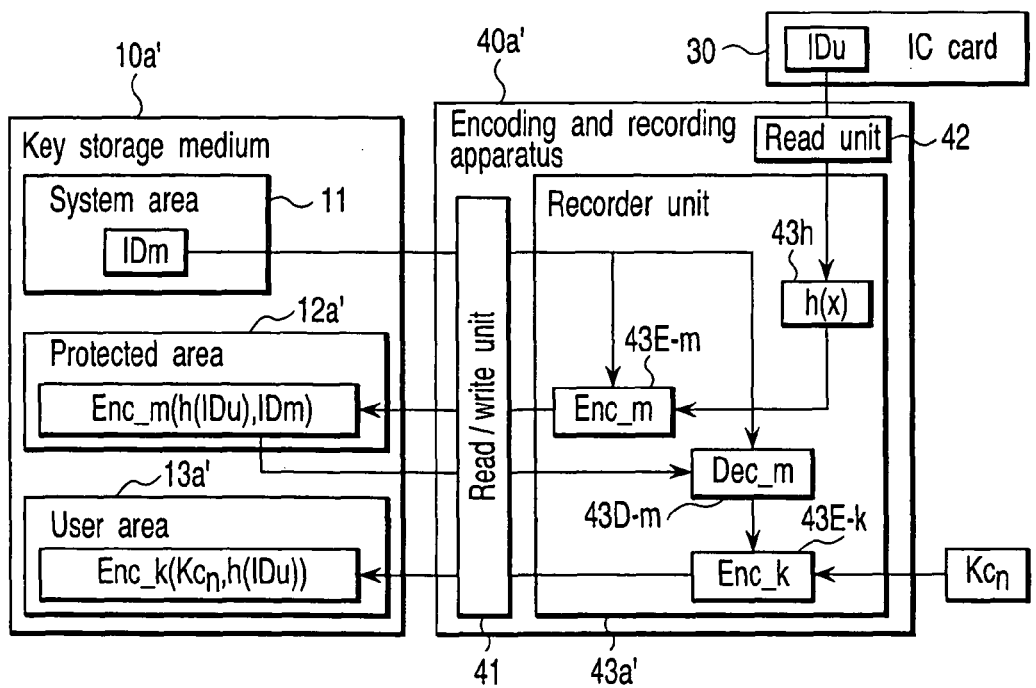
FIG. 32 is a schematic diagram showing a configuration of an encoding and recording apparatus and a key storage medium according to a twenty-second embodiment of the present invention.

FIG. 32 is a schematic diagram showing a configuration of an encoding and recording apparatus and a key storage medium according to a twenty-second embodiment of the present invention.

The present embodiment is a modified example of the first embodiment, and a value $h(ID_u)$ obtained by applying a one-way function such as a hash function to the user identifier $ID_u$ is used in place of the user identifier $ID_u$.

Specifically, as shown in FIG. 32, an encoding and recording apparatus 40a' having a one-way function unit 43h is provided between the read unit 42 and the encoding unit 43E-m. Here, the one-way function unit 43h is to apply a one-way function such as a hash function to the user identifier $ID_u$ input from the read unit 42, and to transmit the obtained value $h(ID_u)$ to the encoding unit 43E-m.

In accordance therewith, as shown in FIG. 32, the encoded user identification value Enc_m($h(ID_u)$, $ID_m$) formed due to the function value $h(ID_u)$ being encoded on the basis of the user identifier $ID_u$ is stored in a protected area 12a' of a key storage medium 10a'. Note that, due to $ID_u$ being read as $h(ID_u)$, the playback apparatus 20a shown in FIG. 2 can be used as a playback apparatus.

With the configuration as described above as well, the effect of the first embodiment can be obtained, and the safety from tapping or the like with respect to the user identifier $ID_u$ can be improved by applying a one-way function to the user identifier $ID_u$.

(Twenty-Third Embodiment)

Figure 33:
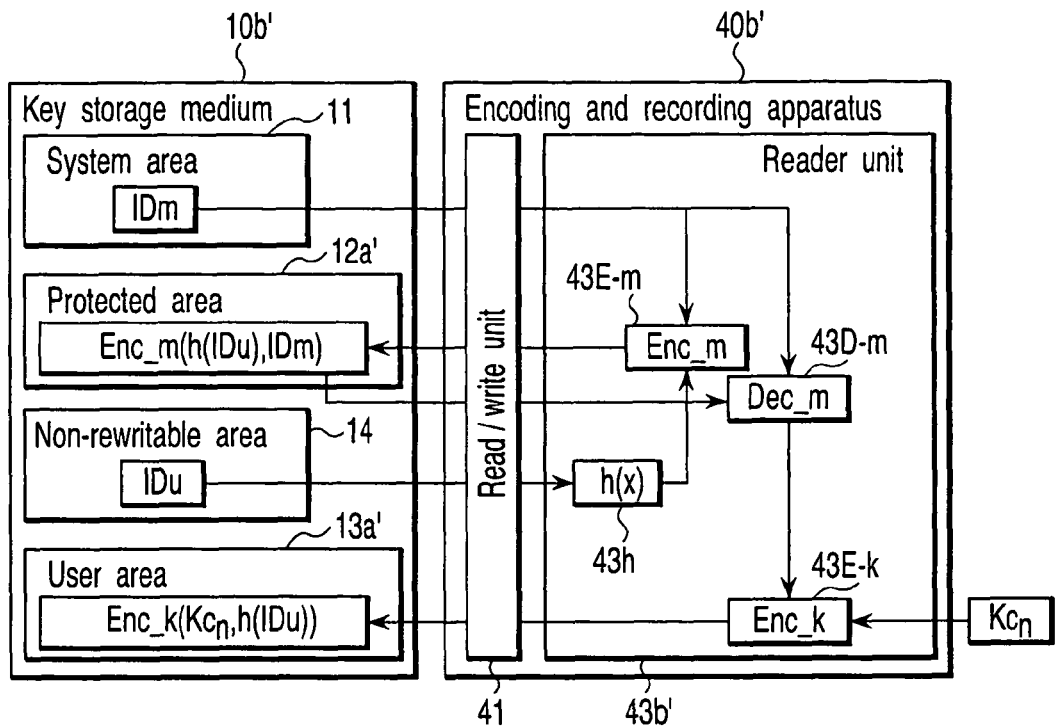
FIG. 33 is a schematic diagram showing a configuration of an encoding and recording apparatus and a key storage medium according to a twenty-third embodiment of the present invention.

FIG. 33 is a schematic diagram showing a configuration of an encoding and recording apparatus and a key storage medium according to a twenty-third embodiment of the present invention.

The embodiment is a modified example of the second embodiment, and a value $h(ID_u)$ obtained by applying a one-way function such as a hash function to the user identifier $ID_u$ is used in place of the user identifier $ID_u$.

Specifically, as shown in FIG. 33, an encoding and recording apparatus 40b+ having the one-way function unit 43h is provided between the read/write unit 41 and the encoding unit 43E-m. Here, the one-way function unit 43h is to apply a one-way function such as a hash function to the user identifier $ID_u$ input from the read/write unit 41, and to transmit the obtained value $h(ID_u)$ to the encoding unit 43E-m.

In accordance therewith, as shown in FIG. 33, the encoded user identification value Enc_m($h(ID_u)$, $ID_m$) formed due to the function value $h(ID_u)$ being encoded on the basis of the user identifier $ID_u$ is stored in a protected area 12b' of a key storage medium 10b'. Note that, due to $ID_u$ being read as $h(ID_u)$, the playback apparatus 20a shown in FIG. 2 can be used as a playback apparatus.

With the configuration as described above as well, the effect of the second embodiment can be obtained, and the safety from tapping or the like with respect to the user identifier $ID_u$ can be improved by applying a one-way function to the user identifier $ID_u$.

(Twenty-Fourth Embodiment)

Twenty-fourth and twenty-seventh embodiments of the present invention are modified examples in which collation units for collating the user identifier $ID_u$ decoded by the decoding units 43D-m, 22D-c in the first and second embodiments are respectively provided. This type of modified example can be applied to, not only the first and second embodiments, but also all the embodiments described above in the same way. However, in the following twenty-fourth and twenty-seventh embodiments, examples applied to the first and second embodiments will be representatively described.

Figure 34:
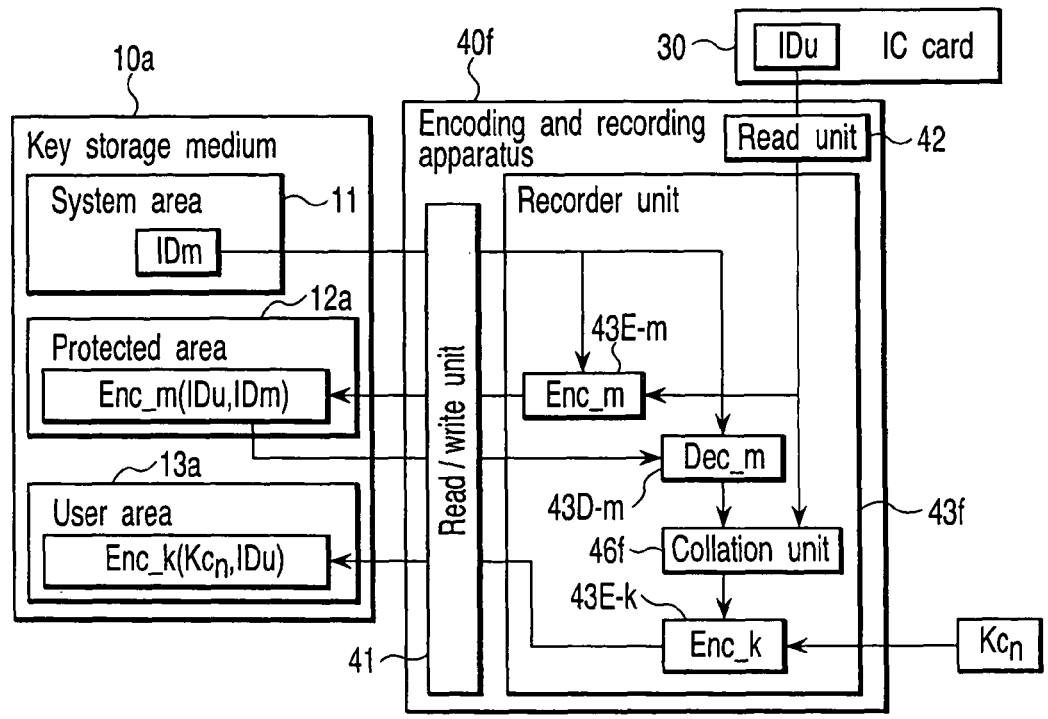
FIG. 34 is a schematic diagram showing a configuration of an encoding and recording apparatus and a key storage medium according to a twenty-fourth embodiment of the present invention.

FIG. 34 is a schematic diagram showing a configuration of an encoding and recording apparatus and a key storage medium according to a twenty-fourth embodiment of the present invention.

The embodiment is a modified example of the first embodiment, and a collation unit 46f is provided between the decoding unit 43D-m and the encoding unit 43E-k of an encoding recording unit 40f.

Here, the collation unit 46f has a function of collating the user identifier $ID_u$ decoded by the decoding unit 43D-m with the user identifier $ID_u$ newly input from the read unit 42, and of operating the encoding unit 43E-k only when the both are coincident with each other. Further, the user identifier $ID_u$ input from the read unit 42 may be transformed to, as described above, not only a form of reading out of the IC card 30, but also a form of reading out of an arbitrary apparatus on a network and a form of reading out of the key storage medium 10b as will be described later.

With the configuration as described as well, the effect of the first embodiment can be obtained. Further, because the collation unit 46f collates the user identifier $ID_u$ in the key storage medium 10a before the content key $Kc_n$ is encoded and recorded, tampering with the key storage medium 10a is sensed, and only users having IC cards are permitted to use the equipment, whereby the safety can be improved.

(Twenty-Fifth Embodiment)

Figure 35:
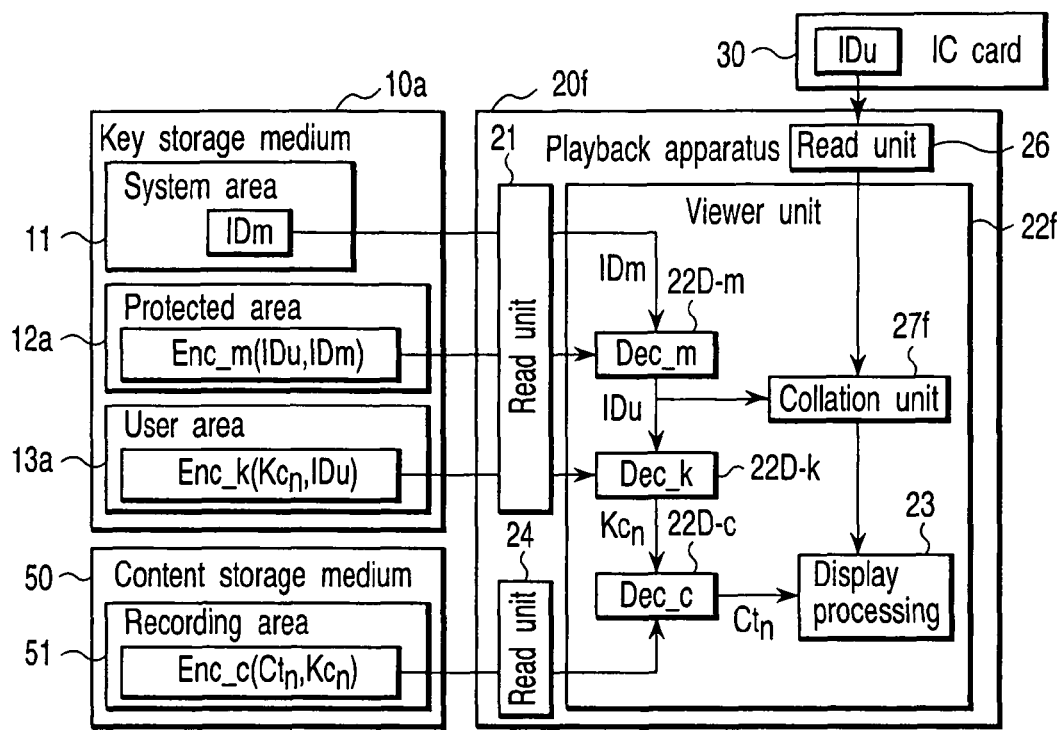
FIG. 35 is a schematic diagram showing a configuration of the key storage medium, a content storage medium, and a playback apparatus according to a twenty-fifth embodiment of the present invention.

FIG. 35 is a schematic diagram showing a configuration of a key storage medium, a content storage medium, and a playback apparatus according to a twenty-fifth embodiment of the present invention.

The embodiment is a modified example of the first embodiment, and a collation unit 27f is provided between the decoding unit 22D-m and the playback processing unit 23 of a playback apparatus 20f.

Here, the collation unit 27f has a function of collating the user identifier $ID_u$ decoded by the decoding unit 22D-m and the user identifier $ID_u$ newly input from a read unit 26, and of correctly operating the display processing unit 23 only when the both are coincident with each other. Note that "correctly operating" means a display operation which does not include an output of an abnormal message. Namely, when the both are not coincident with one another as well, the display processing unit 23 operates. However, the operation in that case is a display operation including an output of an abnormal message.

In addition, the user identifier $ID_u$ input from the read unit 26 as well can be read out of the arbitrary apparatus as described above.

With the configuration as described as well, the effect of the first embodiment can be obtained. Further, because the collation unit 27f collates the user identifier $ID_u$ in the key storage medium 10a before the content data $Ct_n$ is processed to display, tampering with the key storage medium 10a is sensed, and only users having IC cards are permitted to use the equipment, whereby the safety can be improved.

(Twenty-Sixth Embodiment)

Figure 36:
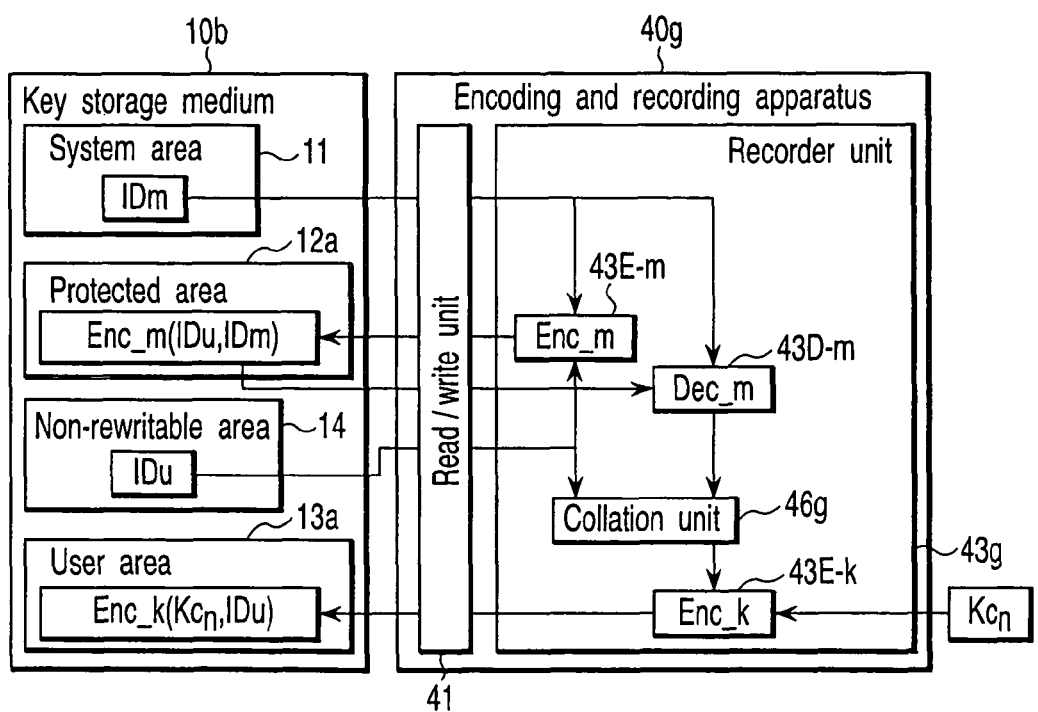
FIG. 36 is a schematic diagram showing a configuration of an encoding and recording apparatus and a key storage medium according to a twenty-sixth embodiment of the present invention.

FIG. 36 is a schematic diagram showing a configuration of an encoding and recording apparatus and a key storage medium according to a twenty-sixth embodiment of the present invention.

The embodiment is a modified example of the second embodiment, and a collation unit 46g is provided between the decoding unit 43D-m and the encoding unit 43E-k of an encoding and recording apparatus 40g.

Here, the collation unit 46g has a function of collating the user identifier $ID_u$ decoded by the decoding unit 43D-m and the user identifier $ID_u$ newly input from the non-rewritable area 14 of the key storage medium 10b via the read/write unit 41, and of operating the encoding unit 43E-k only when the both are coincident with each other.

With the configuration as described as well, the effect of the second embodiment can be obtained. Further, because the collation unit 46g collates the user identifier $ID_u$ in the key storage medium 10b before the content key $Kc_n$ is encoded and recorded, tampering with the key storage medium 10b can be sensed.

(Twenty-Seventh Embodiment)

Figure 37:
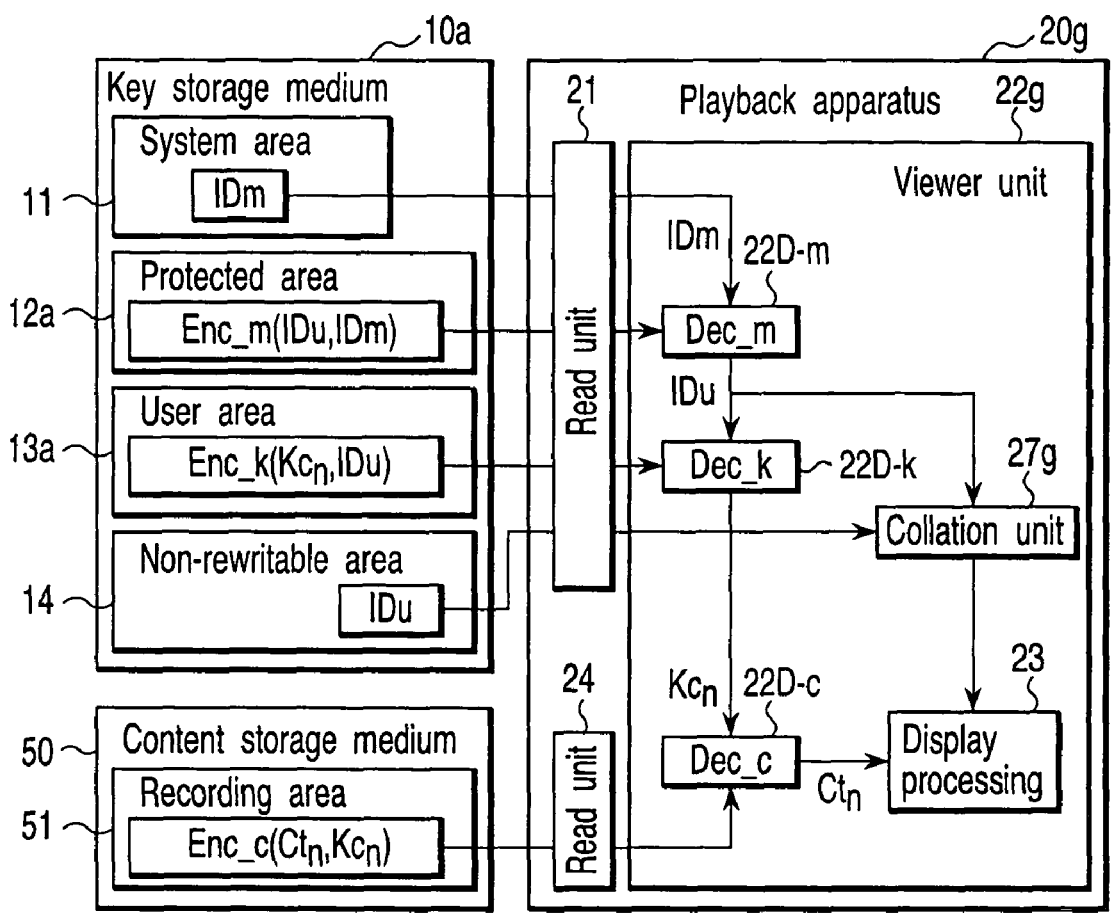
FIG. 37 is a schematic diagram showing a configuration of the key storage medium, a content storage medium, and a playback apparatus according to a twenty-seventh embodiment of the present invention.

FIG. 37 is a schematic diagram showing a configuration of a key storage medium, a content storage medium, and a playback apparatus according to a twenty-seventh embodiment of the present invention.

The embodiment is a modified example of the second embodiment, and a collation unit 27g is provided between the decoding unit 22D-m and the display processing unit 23 of a playback apparatus 20g.

Here, the collation unit 27g has a function of collating the user identifier $ID_u$ decoded by the decoding unit 22D-m and the user identifier $ID_u$ newly read out of the key storage medium 10b via the read unit 21, and of correctly operating the display processing unit 23 only when the both are coincident with each other. Note that the meaning of "correctly operating" is as described in the twenty-fifth embodiment.

With the configuration as described as well, the effect of the second embodiment can be obtained. Further, because the collation unit 27g collates the user identifier $ID_u$ in the key storage medium 10b before the content data $Ct_n$ is processed to display, tampering with the key storage medium 10b can be sensed.

(Twenty-Eighth Embodiment)

Twenty-eighth to thirty-first embodiments of the present invention are respectively modified examples of the first, and third to fifth embodiments described above, and are configured such that, at the recorder units 43a, and 43c to 43e, encoding/decoding elements other than the encoding unit 43E-m with respect to the protected area 12a are omitted. To describe in detail, the decoding unit 43D-m from the protected area 12a is omitted, and the encoding units 43E-k, y, j, and the like onto the user areas 13a, and 13c through 13e are disposed in the server on the network.

This type of modified example can be applied to, not only the third to fifth embodiments, but also the respective embodiments described above in the same way. To describe in detail, it can be applied to the forms (FIGS. 1, 4, 6, 8, 11, 13 to 17, 19, 21, 23, and 32, and the like) which include the alphabets of a, c, d, and e, and which do not include b as a subscript of the encoding and recording apparatus 40. However, at the following twenty-eighth to thirty-first embodiments, examples applied to the first, and third to fifth embodiments will be representatively described.

Figure 38:
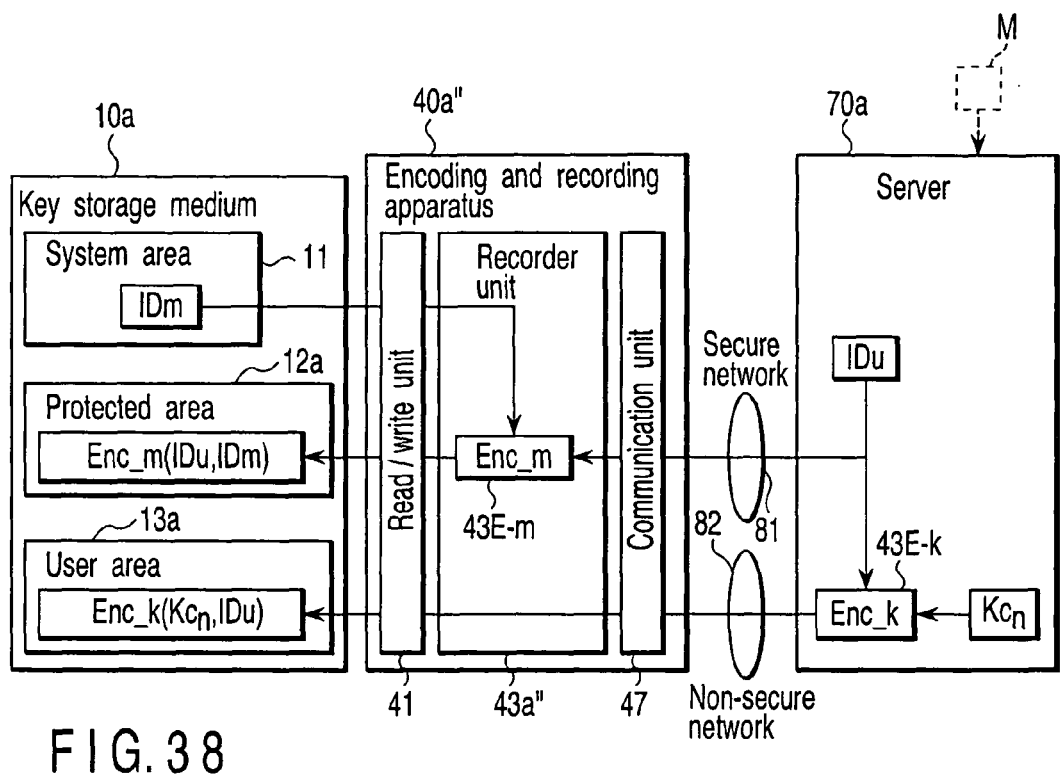
FIG. 38 is a schematic diagram showing a configuration of a server, an encoding and recording apparatus, and a key storage medium according to a twenty-eighth embodiment of the present invention.

FIG. 38 is a schematic diagram showing a configuration of a server, an encoding and recording apparatus, and a key storage medium according to the twenty-eighth embodiment of the present invention.

The present embodiment is a modified example of the first embodiment, and is configured such that, in place of the encoding and recording apparatus 40a, a simplified encoding and recording apparatus 40a" is connected to a server 70a individually via a secure network 81 and a non-secure network 82.

Here, the encoding and recording apparatus 40a" has the read/write unit 41 described above, a simplified recorder unit 43a", and an added communication unit 47.

The read/write unit 41 is, as described above, an interface device between the key storage medium 10a and the recorder unit 43a".

The recorder unit 43a" is a unit in which the encoding unit 43E-m is provided, and the decoding unit 43D-m and the encoding unit 43E-m are omitted in the recorder unit 43a described above, and a key writing function is provided.

However, the encoding unit 43E-m is formed such that the user identifier $ID_u$ to be input is read out of the server 70a via the communication unit 47 and the secure network 81.

In other words, the encoding unit 43E-m has a function of encoding the user identifier $ID_u$ received by the communication unit 47 from the server 70a on the basis of the medium identifier $ID_m$ read out of the system area 11 of the key storage medium 10a by the read/write unit 41, and of writing the obtained an encoded user identifier $Enc\_m(ID_u, ID_m)$ in the protected area 12a of the key storage medium 10a via the read/write unit 41.

The key writing function is a function of writing the encoded content key $Enc\_k(Kc_n, ID_u)$ received from the communication unit 47 when the encoded content key Enc_k ($Kc_n$, $ID_u$) transmitted from the server 70a is received at the communication unit 47 from the non-secure network 82.

Note that, at the time of writing the encoded user identifier Enc_m($ID_u$, $ID_m$) and the encoded content key Enc_k($Kc_n$, $ID_u$) into the key storage medium 10a, the recorder unit 43a" may write the both separately, and may write the both simultaneously. Further, as the order of writing the both, any of the both may be first.

The communication unit 47 is an interface device between a network such as the secure network 81 or the non-secure network 82, and the recorder unit 43a".

The server 70a has a user identification data transmission function and the encoding unit 43E-k, in addition to normal computer functions.

The user identification data transmission function is a function for which the user identifier $ID_u$ maintained in advance in a memory is read out of the memory, and the obtained user identifier $ID_u$ is transmitted to the encoding and recording apparatus 40" via the secure network 81.

The encoding unit 43E-k is the same as the encoding unit 43E-k omitted from the recorder unit 43a, and has a function of encoding content key information $Kc_n$ input in advance on the basis of the user identifier $ID_u$ in the memory, and of transmitting the obtained encoded content key information Enc_k($Kc_n$, $ID_u$) to the encoding and recording apparatus 40a" via the non-secure network 82.

Note that the respective functions of the server 70a may be realized by installing a program stored in an external storage medium M as shown by the broken line in FIG. 38, and may be realized by a ROM having a program stored therein in advance, or the like. In the following respecting embodiments, the illustration of the external storage medium M will be omitted. However, it goes without saying that the respective functions of the server can be realized by installing the program in the external storage medium M in the same way as described above.

The secure network 81 is a transmission path which securely connects between the encoding and recording apparatus 40a" and the server 70a.

The non-secure network 82 is a transmission path which connects between the encoding and recording apparatus 40a" and the server 70a. However, it is not limited to non-secure, and may be replaced with a secure network.

Next, operations of the server, the encoding and recording apparatus and the like configured as described above will be described.

(Encoding Recording)

First, because user identifier $ID_u$ does not exist in the initial state of the key storage medium, it is necessary to process to write user identifier $ID_u$. Here, a user inserts the key storage medium 10a into the encoding and recording apparatus 40a", and accesses to the server 70a.

At the server 70a, the user identification data transmission function is started in accordance with an access. The user identification data transmission function reads out the user identifier $ID_u$ maintained in advance in the memory from the memory, and transmits the obtained user identifier $ID_u$ to the encoding storage medium 40" via the secure network 81.

At the encoding storage medium 40", the recorder unit 43a" encodes the user identifier $ID_u$ transmitted from the server 70a and received by the communication unit 47 to be temporarily maintained in a memory (not shown), on the basis of the medium identifier $ID_m$ read out of the key storage medium 10a, and writes the maintained an encoded user identifier Ecn_m($ID_u$, $ID_m$) in the protected area 12a of the key storage medium 10a via the read/write unit 41.

In accordance therewith, the user identifier $ID_u$ for decoding the encoded content key is maintained in a state of being encoded in the key storage medium 10a.

Next, for example, suppose that the user comes to wish to store the encoded content key in the key storage medium 10a in the future. The user inserts the key storage medium 10a into the encoding storage medium 40a", and accesses to the server 70a.

At the server 70a, the encoding unit 43E-m is started in accordance with this access. The encoding unit 43E-m encodes the content key information $Kc_n$ input in advance on the basis of the user identifier $ID_u$ in the memory, and transmits the obtained encoded content key information Enc_k($Kc_n$, $ID_u$) to the encoding storage medium 40" via the non-secure network 82.

At the encoding storage medium 40", the encoded content key Enc_k($Kc_n$, $ID_u$) transmitted from the server 70a and received at the communication unit 47 is written at the user area 13a of the key storage medium 10a.

In accordance therewith, the content key $Kc_n$ for decoding the encoded content is maintained in a state of being encoded in the key storage medium 10a.

(Playback)

Playback operation is executed in the same way as described above by the playback apparatus 20a of the first embodiment.

As described above, according to the present embodiment, advantages (a) to (c) as follows are provided in addition to the effect of the first embodiment.

(a) There is no need to access to the protected area 12a at the time of writing the encoded content key Enc_k($Kc_n$, $ID_u$) into the key storage medium 10a. Consequently, the decoding unit 43D-m for decoding encoded content key is unnecessary to the entire system.

(b) At the encoding storage medium 40", the encoding unit 43E-k for preparing encoded content key Enc_k($Kc_n$, $ID_u$) is unnecessary.

(c) Because the user identifier $ID_u$ is required to decode the encoded content key at the time of transmitting the encoded content key Enc_k($Kc_n$, $ID_u$) from the server 70a to the encoding storage medium 40", there is no need to insure a secure transmission path, and the non-secure network 82 can be used.

(Twenty-Ninth Embodiment)

Figure 39:
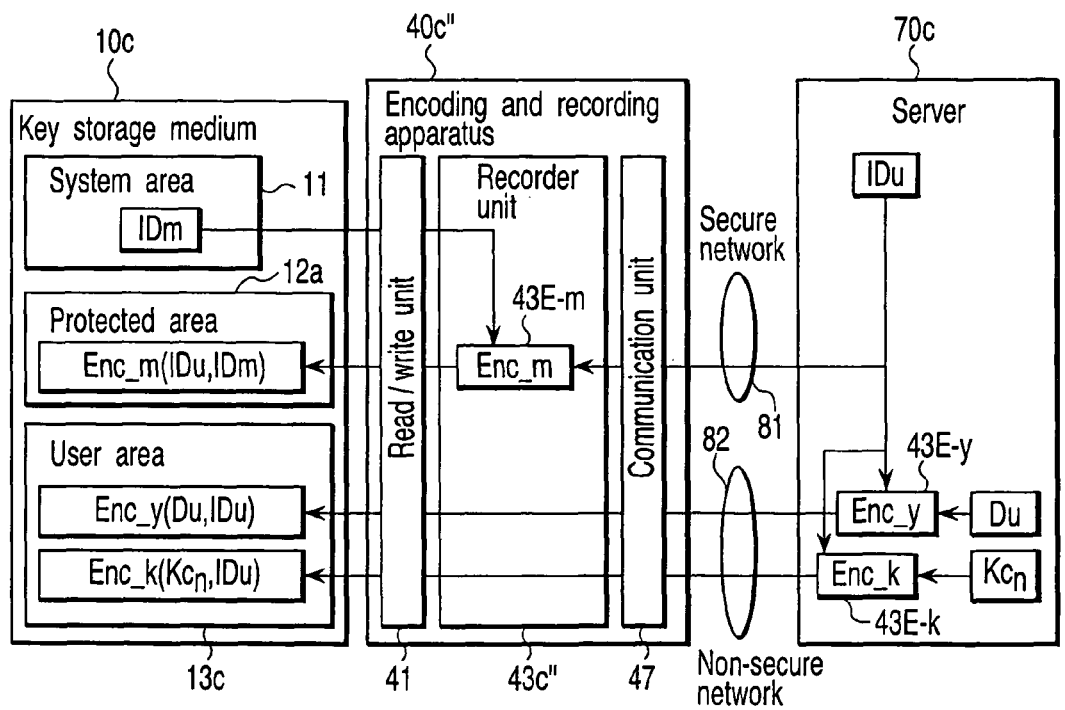
FIG. 39 is a schematic diagram showing a configuration of a server, an encoding and recording apparatus, and a key storage medium according to a twenty-ninth embodiment of the present invention.

FIG. 39 is a schematic diagram showing a configuration of a server, an encoding and recording apparatus, and a key storage medium according to a twenty-ninth embodiment of the present invention.

The embodiment is an example in which the twenty-eighth embodiment is applied to the third embodiment. In addition to the configuration shown in FIG. 38, the encoding unit 43E-y is added to the server 70c, a key writing function (not shown) is added to a recorder unit 43c" of the encoding and recording apparatus 40c", and encoded user attribute information Enc_y(Du, $ID_u$) is stored at the user area 13c.

Here, the encoding unit 43E-y of the server 70c is the same as the encoding unit 43E-y omitted from the recorder unit 43, and has a function of encoding the user attribute information Du input in advance on the basis of the user identifier $ID_u$ in the memory, and of transmitting the obtained encoded user attribute information Enc_y(Du, $ID_u$) to the encoding and recording apparatus 40c" via the non-secure network 82.

The key writing function of the encoding and recording apparatus 40c" is a function of, when the encoded user attribute information Enc_y(Du, $ID_u$) transmitted from the server 70c is received at the communication unit 47 via the secure network 82, writing the encoded user attribute information Enc_y(Du, $ID_u$) received from the communication unit 47 at the user area 13*c* of the key storage medium 10*c*.

Accordingly, with the configuration as described above, the effect of the third embodiment and the effect of the twenty-eighth embodiment can be simultaneously obtained.

(Thirtieth Embodiment)

Figure 40:
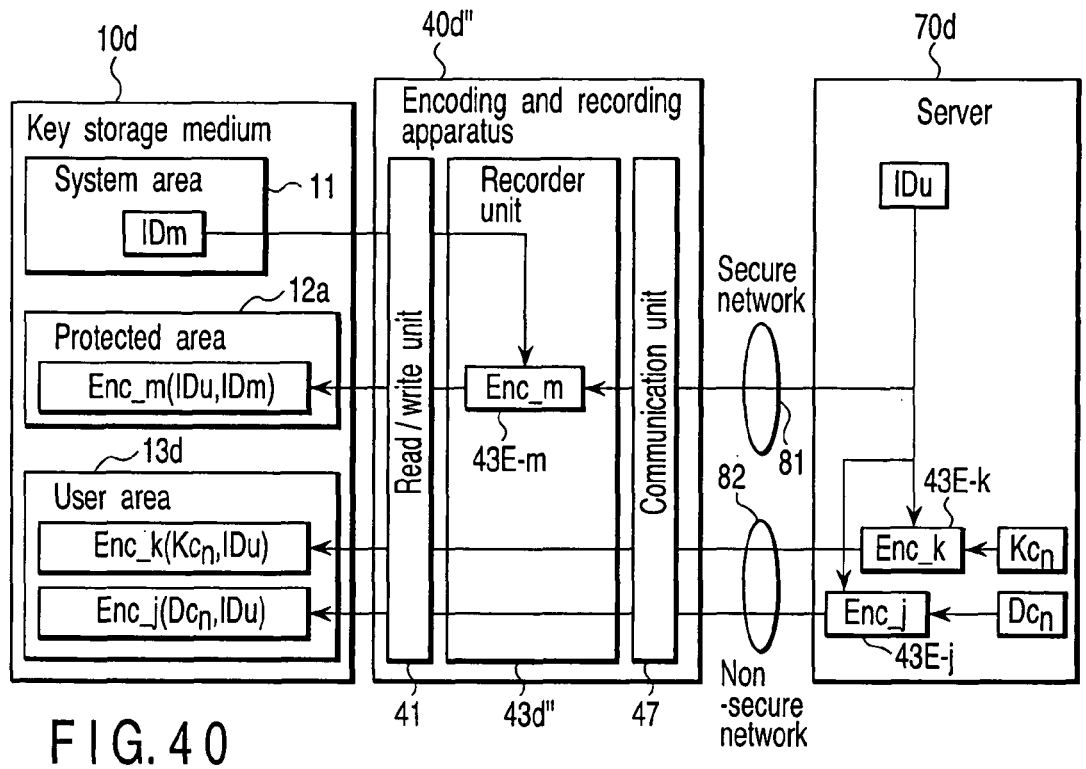
FIG. 40 is a schematic diagram showing a configuration of a server, an encoding and recording apparatus, and a key storage medium according to a thirtieth embodiment of the present invention.

FIG. 40 is a schematic diagram showing a configuration of a server, an encoding and recording apparatus, and a key storage medium according to a thirtieth embodiment of the present invention.

The embodiment is an example in which the twenty-eighth embodiment is applied to the fourth embodiment. In addition to the configuration shown in FIG. 38, an encoding unit 43E-j is added to a server 70*d*, a key writing function (not shown) is added to the recorder unit 43*d''* of the encoding and recording apparatus 40*d''*, and encoded user attribute information Enc_j (Du, $ID_u$) is stored at the user area 13*c*.

In other words, the present embodiment is configured so as to use content attribute information $Dc_n$ in place of the user attribute information of the twenty-ninth embodiment.

In accordance with such a configuration, the effect of the fourth embodiment and the effect of the twenty-eighth embodiment can be simultaneously obtained.

(Thirty-First Embodiment)

Figure 41:
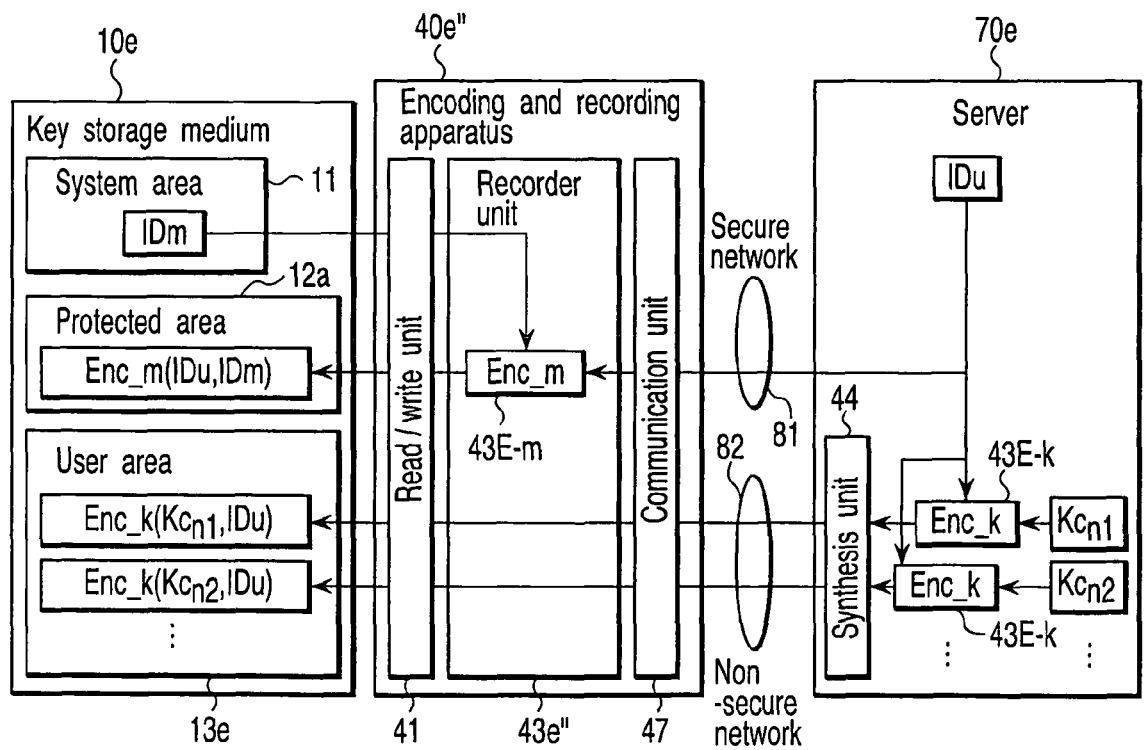
FIG. 41 is a schematic diagram showing a configuration of a server, an encoding and recording apparatus, and a key storage medium according to a thirty-first embodiment of the present invention.

FIG. 41 is a schematic diagram showing a configuration of a server, an encoding and recording apparatus, and a key storage medium according to a thirty-first embodiment of the present invention.

The embodiment is an example in which the twenty-eighth embodiment is applied to the fifth embodiment, and as shown in FIG. 41, a plurality of the encoding units 43E-k (which may be plural time encoding processings by one encoding unit) and one synthesis unit 44 are provided at a server 70*e* in place of the one encoding unit 43E-k (one time encoding processing) in the server 70*a* shown in FIG. 38.

Here, the respective encoding units 43E-k of the server 70*e* have functions of respectively encoding respective content keys $Kc_{n1}$, $Kc_{n2}$, ... received from the exterior on the basis of the user identifier $ID_u$ in the memory, and of transmitting the maintained encoded content keys Enc_k($Kc_{n1}$, $ID_u$), Enc_k ($Kc_{n2}$, $ID_u$), ... to the synthesis unit 44.

The synthesis unit 44 has a function of synthesize the respective encoded content keys received from the respective encoding units 43E-k, and of transmitting the obtained synthesized results as encoded content key synthesis data {Enc-k($Kc_{n1}$, $ID_u$), Enc-k($Kc_{n2}$, $ID_u$), ... } to the encoding and recording apparatus 40*e''* via the non-secure network 82.

A recorder unit 43*e''* of the encoding and recording apparatus 40*e''* has a key writing function (not shown) in the same way as in FIG. 38. The key writing function is a function of writing the encoded content key synthesis data {Enc_k($Kc_{n1}$, $ID_u$), Enc_k($Kc_{n2}$, $ID_u$), ... } received from the communication unit 47 at the user area 13*e* of the key storage medium 10*e*, when the encoded content key synthesis data transmitted from the server 70*e* is received at the communication unit 47 from the non-secure network 82.

In accordance with such a configuration, the effect of the fifth embodiment and the effect of the twenty-eighth embodiment can be simultaneously obtained.

Note that the modified examples as described in the twenty-eighth to thirty-first embodiments can be applied to, as described above, not only the first, and third to fifth embodiments, but also the respective embodiments described above as well.

(Thirty-Second Embodiment)

Thirty-second embodiment is a modified example in which a value $h(ID_u)$ obtained by applying a one-way function such as a hash function to the user identifier $ID_u$ is used in place of the user identifier $ID_u$ in the twenty-eighth embodiment. This type of modified example can be applied to, not only the twenty-eighth embodiment, but also the respective embodiments described above as well in the same way. To describe in detail, it can be applied to the forms (FIGS. 1, 4, 6, 8, 11, 13 to 17, 19., 21, 23, 32, and 38 to 41, and the like) which include the alphabets of a, c, d, and e, and which do not include b as a subscript of the encoding and recording apparatus 40. However, in the following thirty-second embodiment, an example applied to the twenty-eighth embodiment will be representatively described.

Figure 42:
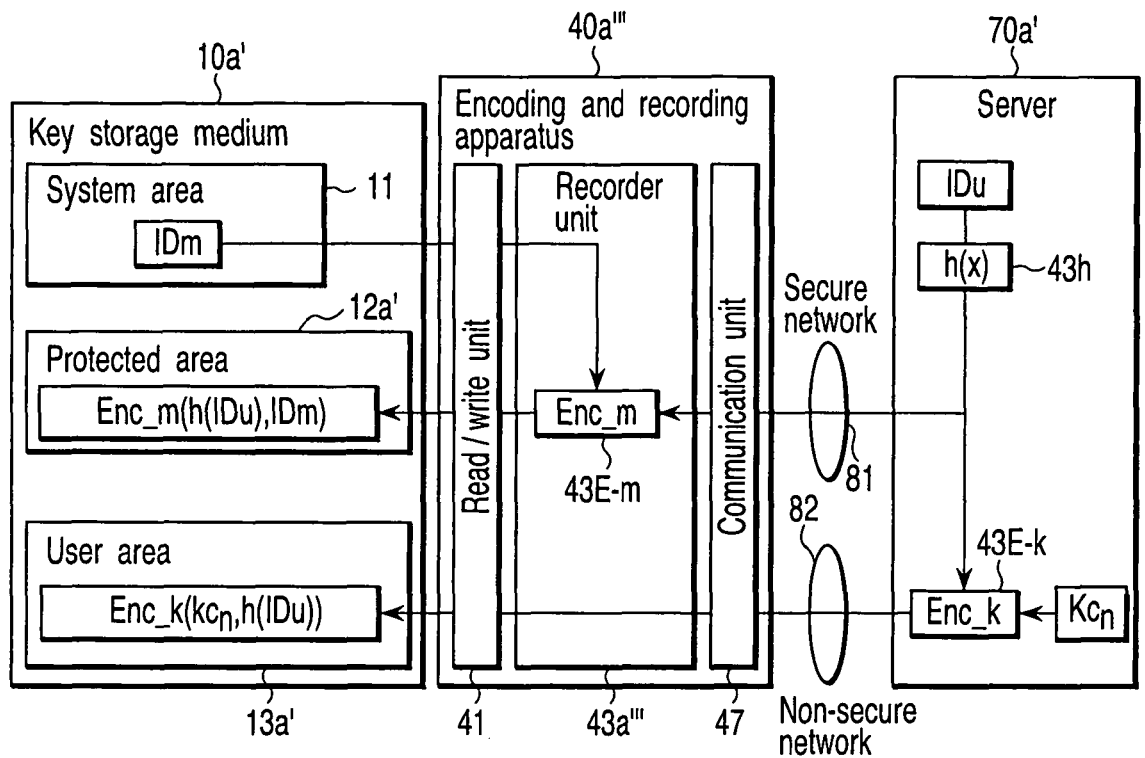
FIG. 42 is a schematic diagram showing a configuration of a server, an encoding and recording apparatus, and a key storage medium according to a thirty-second embodiment of the present invention.

FIG. 42 is a schematic diagram showing a configuration of a server, an encoding and recording apparatus, and a key storage medium according to the thirty-second embodiment of the present invention.

The present embodiment is a modified example of the twenty-eighth embodiment, and a value $h(ID_u)$ obtained by applying a one-way function such as a hash function to the user identifier $ID_u$ is used in place of the user identifier $ID_u$.

To describe concretely, as shown in FIG. 42, at a server 70*a'*, the one-way function unit 43*h* is provided between the memory of the user identifier $ID_u$ and the encoding unit 43E-m. Here, the one-way function unit 43*h* is to apply a one-way function such as a hash function to the user identifier $ID_u$ read out of the memory, and to transmit the obtained value $h(ID_u)$ to the encoding unit 43E-m.

In accordance therewith, as shown in FIG. 42, the encoded user identification value Enc_m($h(ID_u)$, $ID_m$) formed due to the function value $h(ID_u)$ being encoded on the basis of the user identifier $ID_u$ is stored in the protected area 12*a'* of the key storage medium 10*a'*. Note that, due to $ID_u$ being read as $h(ID_u)$, the playback apparatus 20*a* shown in FIG. 2 can be used as a playback apparatus.

With the configuration as described above as well, the effect of the twenty-eighth embodiment can be obtained, and further, the safety from tapping or the like with respect to the user identifier $ID_u$ can be improved by applying a one-way function to the user identifier $ID_u$.

Note that the techniques described-in the above-described respective embodiments are stored as programs which can be executed by computers in recording media such as magnetic disks (floppy (registered trademark) disks, hard disks, and the like), optical disks (CD-ROM/DVD and the like), optical magnetic disks (MO), semiconductor memories, and the like, and can be distributed.

Further, as the recording media, recording media which can store programs therein and out which computers can read may have any form of the storing system.

Further, middle ware (MW) or the like such as operating system (OS), database management software, network software, or the like, which is working on a computer on the basis of an instruction of the program installed in the computer from the storage medium may execute some of the respective processings for realizing the present embodiment.

Moreover, the recording media in the present invention are not limited to media independent of the computer, and recording media in which a program transmitted by LAN, Internet, or the like is downloaded, and stored or temporarily stored are included therein.

Further, the storage medium is not limited to one, and a case where the processings in the present embodiment are executed from a plurality of media is included in the storage medium in the present invention, and the medium configuration may be any configuration.

Note that, the computer in the present invention is to execute the respective processings in the present embodiment on the basis of the program stored in the storage medium, and may be any configuration of an apparatus formed from one such as a personal computer, a system in which a plurality of apparatuses are connected through a network, and the like.

Note that the computer in the present invention is not limited to a personal computer, and includes an arithmetic processing device, a microcomputer, and the like included information processing equipment, and is general term for equipment/apparatus which can realize the functions of the present invention by the program.

Note that the invention is not limited to the above-described respective embodiments, and can be variously modified within a range which does not deviate from the gist of the present invention at the stage of implementing the invention. Further, the respective embodiments may be combined as much as possible to execute, and in that case, an effect of the combination can be obtained. Moreover, inventions at various stages are included in the above-described respective embodiments, and various inventions can be extracted by appropriate combinations of a plurality of structural requirements disclosed. For example, in a case where an invention is extracted due to several structural requirements being omitted from all of the structural requirements shown in the embodiments, when the extracted invention is executed, the omitted portions are appropriately compensated by a well-known commonly used art.

In addition thereto, the present invention can be variously modified and executed within a range which does not deviate from the gist of the present invention.

As described above, the encoding and recording apparatus, playback apparatus, and program according to the present invention are effective in a case where the possibility of a capacity shortage of a protected area accompanying an increase in an information amount and the number of content keys is solved.

What is claimed is:

1. An encoding and recording apparatus for encoding a content key and recording the content key in a key storage medium when the content key corresponding to encoded content recorded in a content storage medium is input, the key storage medium having a protected area, and a user area, the protected area being protected by an equipment authentication, the user area not being protected by the equipment authentication, the encoding and recording apparatus comprising:
an equipment authentication means for executing the equipment authentication with the key storage medium;
first encoding means for encoding fixed information which is input in advance and different for each user, and for writing the obtained encoded fixed information in the protected area of the key storage medium after the equipment authentication;
decoding means for obtaining fixed information by decoding the encoded fixed information in the protected area; and
second encoding means for encoding the content key based on at least one of the fixed information obtained by the decoding means and newly input fixed information, and for writing the obtained encoded content key in user area of the storage medium other than the protected area, the obtained encoded content key not being written in the protected area,
wherein the content storage medium and the key storage medium are physically different mediums.

2. The encoding and recording apparatus according to claim 1, wherein
the first encoding means execute the encoding with a medium identifier recorded in the key storage medium being a key.

3. An encoding and recording apparatus for encoding a content key and recording the content key in a key storage medium when the content key corresponding to encoded content recorded in a content storage medium is input, the key storage medium having a protected area, and a user area, the protected area being protected by an equipment authentication, the user area not being protected by the equipment authentication, the encoding and recording apparatus comprising:
an equipment authentication means for executing the equipment authentication with the key storage medium;
decoding means for obtaining fixed information by decoding encoded fixed information when the encoded fixed information which is written in advance in the protected area of the key storage medium and which is formed due to fixed information different for each user being encoded is read out of the protected area; and
second encoding means for encoding the content key based on at least one of the fixed information obtained by the decoding means and newly input fixed information, and for writing the obtained encoded content key in the user area of the key storage medium other than the protected area, the obtained encoded content key not being written in the protected area,
wherein the content storage medium and the storage medium are physically different mediums.

4. The encoding and recording apparatus according to claim 1, further comprising:
read/write means for maintaining the key storage medium, and for executing reading/writing of information with respect to the key storage medium.

5. The encoding and recording apparatus according to claim 1, further comprising:
collation means for collating the fixed information obtained by the decoding means with the fixed information which is newly input and is different for each user, and for operating the second encoding means only when both are coincident with each other.

6. The encoding and recording apparatus according to claim 1, further comprising:
third encoding means for encoding user attribute information input in advance, and for writing the obtained encoded user attribute information in the user area of the key storage medium.

7. The encoding and recording apparatus according to claim 1, further comprising:
fourth encoding means for encoding content attribute information input in advance, and for writing the obtained encoded content attribute information in the user area of the key storage medium.

8. The encoding and recording apparatus according to claim 1, wherein the second encoding means comprises:
a plurality of encoding units configured to encode a plurality of content keys different from one another based on the fixed information; and
a synthesis unit configured to synthesize the plurality of content keys obtained by the respective encoding units, and to write obtained encoded content keys synthesis information in the user area of the key storage medium.

9. An encoding and recording apparatus for recording a content key formed due to the content key corresponding to encoded content recorded in a content storage medium being encoded in a key storage medium, the key storage medium having a protected area, and a user area, the protected area being protected by an equipment authentication, the user area not being protected by the equipment authentication, the encoding and recording apparatus comprising:

an equipment authentication means for executing the equipment authentication with the key storage medium;

first encoding means for encoding fixed information when the fixed information different for each user is received from a network, and for writing the obtained encoded fixed information in the protected area of the key storage medium after the equipment authentication; and key writing means for writing encoded content key in the user area of the key storage medium other than the protected area when the encoded content key which can be decoded by the fixed information is received from a network, the encoded content key not being written in the protected area, wherein the content storage medium and the key storage medium are physically different mediums.

10. The encoding and recording apparatus according to claim 9, wherein the first encoding means executes the encoding with a medium identifier recorded in the key storage medium being as a key.

11. The encoding and recording apparatus according to claim 10, further comprising:

attribute information writing means for writing the encoded attribute information in the user area of the key storage medium other than the protected area, when encoded attribute information which can be decoded by the fixed information is received from the network.

12. The encoding and recording apparatus according to claim 9, further comprising:

attribute information writing means for writing the encoded attribute information in the user area of the key storage medium other than the protected area, when the encoded attribute information which can be decoded by the fixed information is received from the network.

13. The encoding and recording apparatus according to claim 11, wherein the encoded attribute information is at least one of encoded user attribute information formed due to user attribute information being encoded by the fixed information and encoded content attribute information formed due to content attribute information being encoded by the fixed information.

14. A non-transitory computer readable medium encoded with a computer program configured to cause an information processing apparatus to execute a method, for use in a server apparatus which can communicate individually via a secure network and non-secure network with respect to an encoding and recording apparatus having a function of encoding fixed information to be input which is different for each user and recording the fixed information in a protected area of a key storage medium, and a function of recording an encoded content key which can be decoded by the fixed information in user area of the key storage medium other than the protected area, the encoded content key not being written in the protected area, the protected area being protected by an equipment authentication, the user area not being protected by the equipment authentication, the method comprising:

executing a fixed information transmitting process for reading out the fixed information maintained in advance in a memory from the memory, and for transmitting the obtained fixed information to the encoding and recording apparatus via the secure network; and executing a key encoding process for encoding the content key input in advance based on the fixed information in the memory, and for transmitting the obtained encoded content key to the encoding and recording apparatus via the non-secure network.

15. The non-transitory computer readable medium according to claim 14, wherein the method further comprises:

executing an attribute information encoding process for encoding at least one of user attribute information and content attribute information which is input in advance based on the fixed information in the memory, and for transmitting the obtained encoded attribute information to the encoding and recording apparatus via the non-secure network.

16. The non-transitory computer readable medium according to claim 15, wherein the key encoding process includes encoding content keys different from one another based on the fixed information, and synthesizing a plurality of encoded content keys obtained by the respective encoding process, and transmitting the obtained encoded content keys synthesis information to the encoding and recording apparatus.

17. The non-transitory computer readable medium according to claim 14, wherein the key encoding process includes encoding content keys different from one another based on the fixed information, and synthesizing a plurality of encoded content keys obtained by the respective processes, and transmitting the obtained encoded content keys synthesis information to the encoding and recording apparatus.

* * * * *